(12) United States Patent
Maeda

(10) Patent No.: US 11,446,945 B2
(45) Date of Patent: Sep. 20, 2022

(54) SYSTEM AND METHOD THEREOF

(71) Applicant: Canon Kabushiki Kaisha, Tokyo (JP)

(72) Inventor: Masao Maeda, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/109,325

(22) Filed: Dec. 2, 2020

(65) Prior Publication Data

US 2021/0170772 A1 Jun. 10, 2021

(30) Foreign Application Priority Data

Dec. 4, 2019 (JP) .............................. JP2019-219853

(51) Int. Cl.
*B41J 29/393* (2006.01)
*B41J 2/165* (2006.01)
*G06N 3/08* (2006.01)
*B41J 2/175* (2006.01)

(52) U.S. Cl.
CPC .............. *B41J 29/393* (2013.01); *B41J 2/165* (2013.01); *B41J 2/16505* (2013.01); *B41J 2/16517* (2013.01); *B41J 2/17546* (2013.01); *B41J 2/17566* (2013.01); *G06N 3/08* (2013.01)

(58) Field of Classification Search
CPC ..... B41J 2/165; B41J 2/16505; B41J 2/16517
See application file for complete search history.

(56) References Cited

U.S. PATENT DOCUMENTS

2020/0101603 A1* 4/2020 Satou ................. B25J 9/1633
2021/0097360 A1* 4/2021 Sato .................. B41J 2/04581

FOREIGN PATENT DOCUMENTS

| CN | 111942022 A | * | 11/2020 | ............. G06N 20/00 |
| JP | 2877872 B2 | | 4/1999 | |
| JP | 2020142472 A | * | 9/2020 | ............... G06N 3/08 |

* cited by examiner

*Primary Examiner* — Sharon Polk
(74) *Attorney, Agent, or Firm* — Venable LLP

(57) ABSTRACT

According to the present invention, provided is a system comprising: an acquisition unit configured to acquire log information of a job executed on a device; and a learning unit configured to perform learning for generating, by using the log information of the device acquired by the acquisition unit as learning data, a learned model to be used by the device to estimate necessity of executing a maintenance operation.

18 Claims, 22 Drawing Sheets

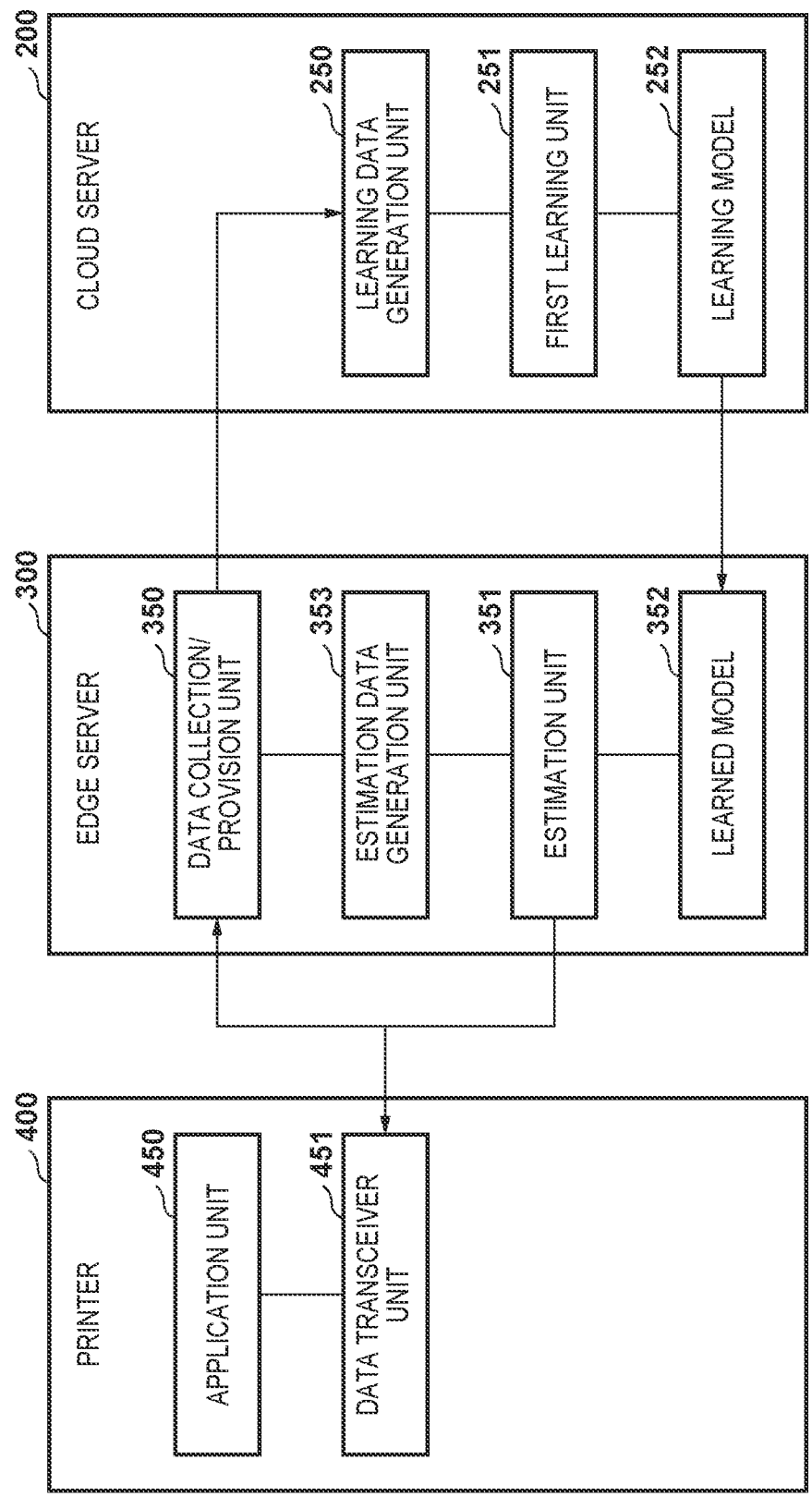

FIG. 10A

| PRINT JOB LOG INFORMATION | ~940 |
|---|---|
| LOG IDENTIFIER | ~941 |
| JOB TYPE INFORMATION (PRINT) | ~942 |
| JOB START DATE AND TIME | ~943 |
| JOB END DATE AND TIME | ~944 |
| PRINTER IDENTIFIER | ~945 |
| PRINT JOB HEADER INFORMATION | ~946 |
| PRINT JOB DATA INFORMATION | ~947 |
| COLOR PAGE COUNT | ~948 |
| MONOCHROME PAGE COUNT | ~949 |
| INK USAGE AMOUNT | ~950 |

FIG. 10B

| COPY JOB LOG INFORMATION | ~960 |
|---|---|
| LOG IDENTIFIER | ~961 |
| JOB TYPE INFORMATION (COPY) | ~962 |
| JOB START DATE AND TIME | ~963 |
| JOB END DATE AND TIME | ~964 |
| PRINTER IDENTIFIER | ~965 |
| SHEET SIZE | ~966 |
| SHEET TYPE | ~967 |
| PRINT QUALITY SETTING | ~968 |
| COPY COUNT SETTING | ~969 |
| DOUBLE-SIDED PRINT SETTING | ~970 |
| COLOR PAGE COUNT | ~971 |
| MONOCHROME PAGE COUNT | ~972 |
| INK USAGE AMOUNT | ~973 |

FIG. 10C

| MAINTENANCE JOB LOG INFORMATION | ~980 |
|---|---|
| LOG IDENTIFIER | ~981 |
| JOB TYPE INFORMATION (MAINTENANCE) | ~982 |
| JOB START DATE AND TIME | ~983 |
| JOB END DATE AND TIME | ~984 |
| PRINTER IDENTIFIER | ~985 |
| MAINTENANCE TYPE (MANUAL/AUTOMATIC) | ~986 |
| CLEANING TYPE (STANDARD CLEANING/POWERFUL CLEANING/ CAPPING/CAPPING CANCELLATION) | ~987 |

SYSTEM AND METHOD THEREOF

BACKGROUND OF THE INVENTION

Field of the Invention

The present invention relates to a system and a method thereof.

Description of the Related Art

There are cases where a device performs a maintenance operation on a regular basis in order to guarantee performance and quality of a function thereof. For example, it is necessary to maintain a good discharge condition of a printhead at all times in order to maintain the quality of a print product in a printing apparatus of an ink-jet method. When the printhead is left in a state where printing is not performed, it is likely for thickening and solidification of ink to occur in a discharging port or an inward fluid channel thereof. Also, there are cases where if there is a difference in usage frequencies between discharge nozzles of a plurality of printheads due to the content of print data when performing printing, a difference in discharge characteristics occurs, and ink dot sizes and shapes will not be the same.

As described above, because the condition of the printhead changes depending on various factors, a recovery mechanism for the printhead is provided in order to maintain a good condition. The recovery mechanism sucks ink in the vicinity of the discharging port of the printhead with a pump in order to remove thickening or solidification and by causing a predetermined amount of ink to be discharged from a discharge nozzle in the recovery mechanism, stabilizes the discharge characteristics. Such recovery control is performed by an instruction from the control system of the printing apparatus. Aside from being performed in a case where a user, after observing the condition of a print product, instructs an execution of recovery control, a technique for automatically performing recovery control in accordance with a non-use time or with usage conditions of the apparatus has been devised. In Japanese Patent No. 2877872, a method for storing date and time information of when an apparatus was used, comparing against the stored date and time information at a time of print execution in order to measure non-use time, and executing recovery control in accordance with the non-use time is disclosed.

However, there is variability in manufacturing of a printhead, and also, variability in characteristics occurs in accordance with the environment such as the surrounding temperature and humidity.

SUMMARY OF THE INVENTION

The invention of the present application is able to execute a maintenance operation in a device at an appropriate timing.

The invention of the present application has the following configuration. In other words, according to a first aspect, provided is a system comprising: at least one memory; and at least one processor, wherein the at least one processor is configured to, when executing a program stored in the at least one memory, cause the system to function as the following units: an acquisition unit configured to acquire log information of a job executed on a device; and a learning unit configured to perform learning for generating, by using the log information of the device acquired by the acquisition unit as learning data, a learned model to be used by the device to estimate necessity of executing a maintenance operation.

Also, according to a second aspect, provided is a system comprising: at least one memory; and at least one processor, wherein the at least one processor is configured to, when executing a program stored in the at least one memory, cause the system to function as the following units: an acquisition unit configured to acquire information based on a job to be newly executed by a device; and an estimation unit configured to estimate, by applying information based on the job to be newly executed by the device acquired by the acquisition unit as input data to a learned model for estimating necessity to execute a maintenance operation, the necessity to execute the maintenance operation by the device.

By virtue of the present invention, it becomes possible to perform a maintenance operation in a device at an optimal timing.

Further features of the present invention will become apparent from the following description of exemplary embodiments with reference to the attached drawings.

BRIEF DESCRIPTION OF THE DRAWINGS

FIG. 7 is a view for illustrating an example of a software configuration of each apparatus according to a first embodiment.

FIG. 10A, FIG. 10B, and FIG. 10C are views for illustrating examples of data structures of job log information according to the embodiment of the invention of the present application.

DESCRIPTION OF THE EMBODIMENTS

Figure 1:
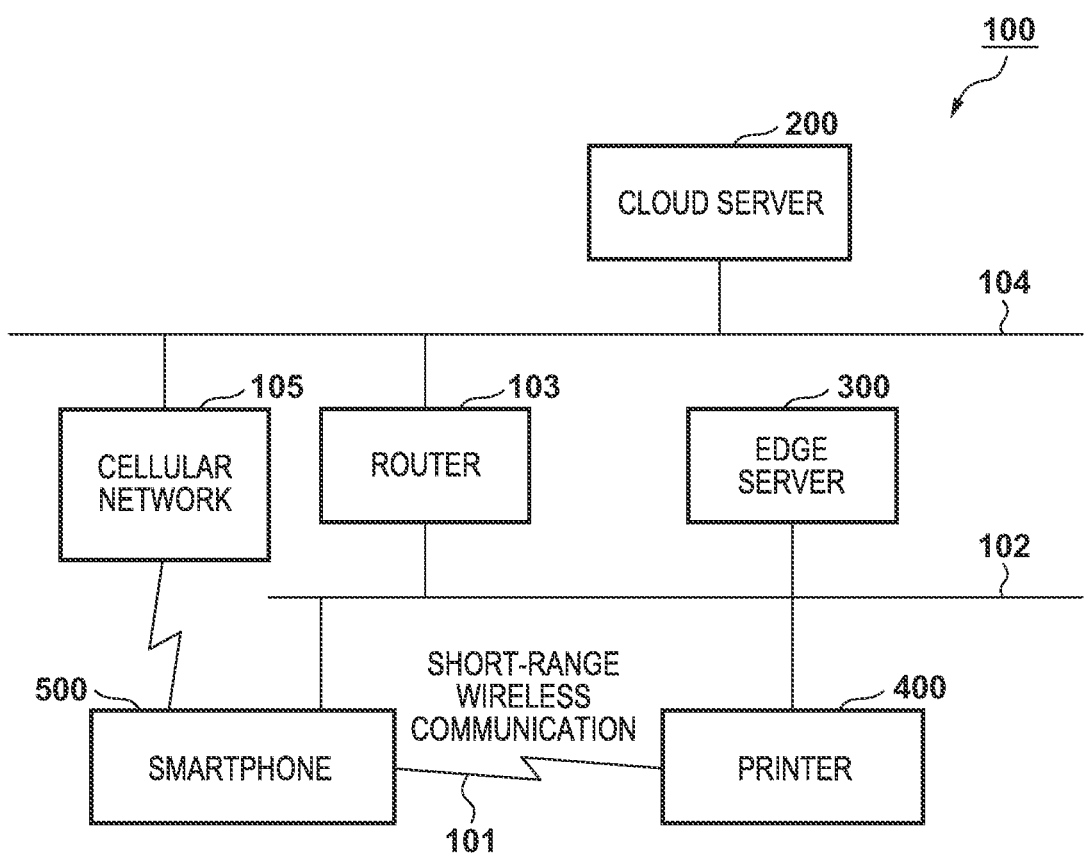
FIG. 1 is a view for illustrating a configuration example of a processing system according to the invention of the present application.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

[System Configuration]

FIG. 1 is a view for illustrating a configuration example of a processing system 100 according to the present embodiment. The processing system 100 is configured to include a local area network (LAN) 102 and a cloud server 200, an edge server 300, and various devices connected by the Internet 104. Examples of the devices are a printer 400 which is an image processing apparatus, a smartphone 500 which is a mobile terminal, a client terminal (not illustrated) such as a personal computer or a work station, a digital camera (not illustrated), and the like. However, the devices are not limited to such types and may include, for example, a household appliance such as a refrigerator, a television, and an air conditioner. In other words, although in the present embodiment, the printer 400 described as an example of a device that performs a maintenance operation, the invention of the present application can be applied even in a case where a maintenance operation is performed in another apparatus. These devices are connected to each other via the LAN 102 and can be connected to the Internet 104 via a router 103 that is placed in the LAN 102.

Although the router 103 is illustrated as a device for connecting the LAN 102 and the Internet 104, it can be made to hold a wireless LAN access point function that configures the LAN 102. In such a case, each device, aside from connecting to the router 103 by the wired LAN, can be configured to connect with an access by wireless LAN in order to join the LAN 102. For example, it is possible to configure the printer 400 to connect by the wired LAN and the smartphone 500 to connect by the wireless LAN.

Each device and the edge server 300 are able to communicate with each other with the cloud server 200 via the Internet 104 to which they were connected via the router 103. The edge server 300 and each device are able to communicate with each other via the LAN 102. Also, the respective devices are able to communicate with each other via the LAN 102. Also, the smartphone 500 and the printer 400 are able to communicate via a short-range wireless communication 101. As the short-range wireless communication 101, wireless communication that is compliant with a Bluetooth (registered trademark) standard or an NFC (Near Field Communication) standard may be used. Also, the smartphone 500 is connected to a cellular network 105 and is able to communicate with the cloud server 200 via the cellular network 105.

Note that the above configuration indicates an example of the present invention, and no limitation is made to this. For example, although an example in which the router 103 comprises an access point function was given, an access point may be configured by an apparatus other than the router 103. Also, connections between the edge server 300 and each device may use a connection unit aside from the LAN 102. For example, a wireless communication aside from a wireless LAN, such as LPWA (Low Power Wide Area), ZigBee, Bluetooth (registered trademark) and short-range wireless communication and the like; a wired connection such as a USB; or infrared communication; and the like are used.

Also, although only one printer 400, which is a device that transmits a log, is illustrated in FIG. 1, a plurality of printers 400 may be arranged. Also, a configuration may be such that other types of devices that transmit a log are further arranged and the edge server 300 performs collecting or relaying of logs in relation to each device.

(Server Apparatus)

Figure 2:
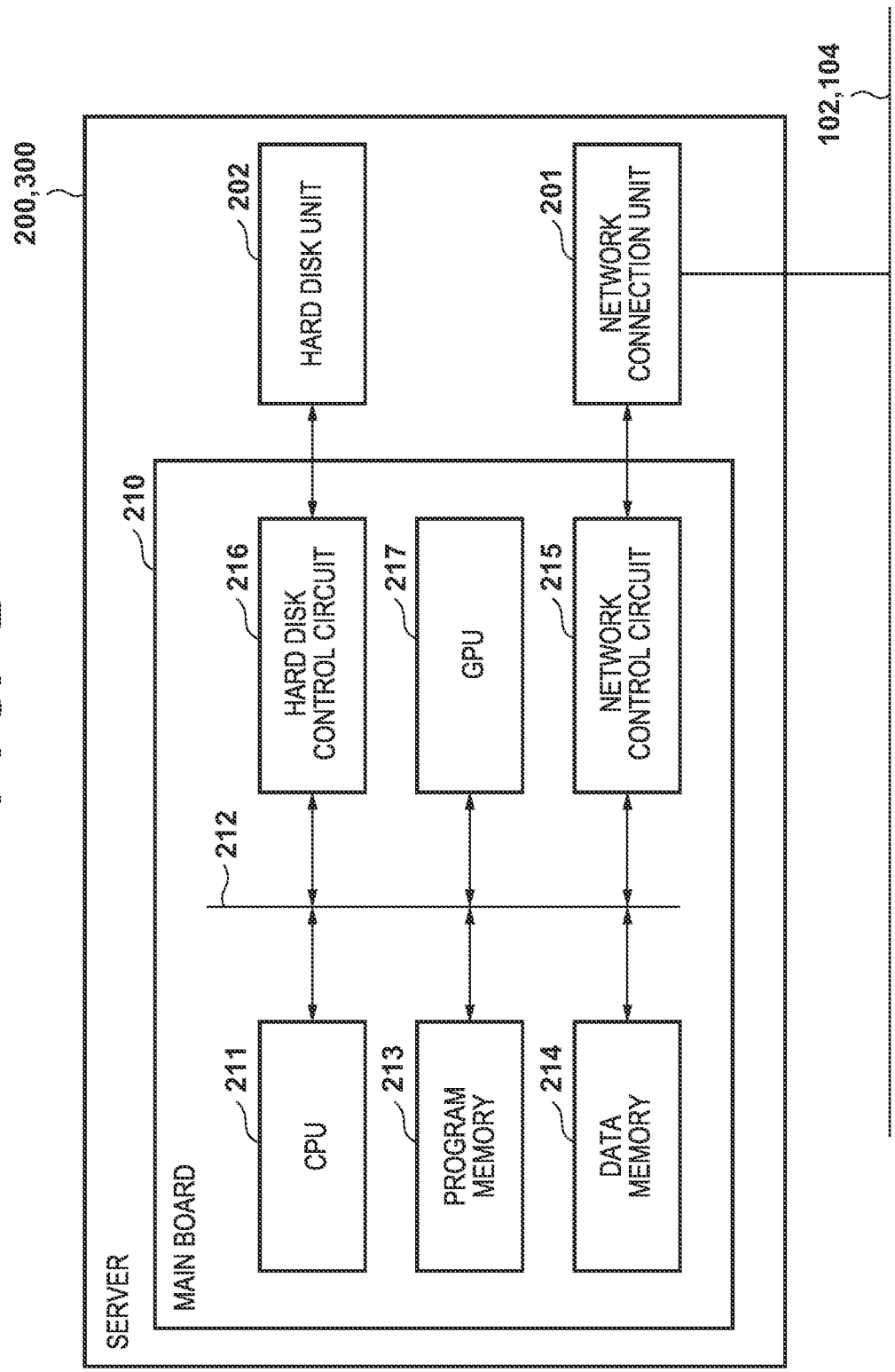
FIG. 2 is a view for illustrating an example of a hardware configuration of each server according to an embodiment of the invention of the present application.

FIG. 2 is a block diagram for illustrating an example of a hardware configuration of an information processing apparatus, which is able to operate as the cloud server 200 and the edge server 300, according to the present embodiment. Here, the hardware configurations of the cloud server 200 and the edge server 300 are described as the same. The server is configured to include a main board 210 for performing control of an entire apparatus, a network connection unit 201, and a hard disk unit 202. On the main board 210, a CPU 211 operates in accordance with a control program that is stored in a program memory 213 and the content of a data memory 214, which are connected via an internal bus 212. The CPU 211, by controlling the network connection unit 201 via a network control circuit 215, connects to a network such as the Internet 104 and the LAN 102 and thereby performs communication with another apparatus. The CPU 211 is able to execute reading/writing of data in relation to the hard disk unit 202 that is connected via a hard disk control circuit 216.

In the hard disk unit 202, aside from an operating system (OS) that is used by being loaded into the program memory 213 and each type of control software being stored, each type of data is also stored. A GPU 217 is connected to the main board 210 and is able to execute each type of calculation processing in place of the CPU 211. The GPU 217 is able to perform an efficient calculation by performing parallel processing of more data. Thus, in a case where learning by machine learning such as deep learning which uses a learning model and extends over a plurality of rounds is performed, it is effective to perform processing in the GPU 217.

In this embodiment, assume that the GPU 217 will be used in addition to the CPU 211 for processing by a learning unit 251, which will be described later. Specifically, in a case where a learning program including a learning model is executed, learning is performed by the CPU 211 and the GPU 217 cooperating in order to perform a calculation. Note that configuration may be such that a calculation for the processing of the learning unit 251 is performed only by the CPU 211 or the GPU 217. Also, an estimation unit 351 may use the CPU 211 or the GPU 217 similarly to the learning unit 251. Also, although it was described in the present embodiment that the cloud server 200 uses the same configuration as the edge server 300, the system is not limited to this configuration. For example, a configuration may be taken so as to provide in the cloud server 200 but not provide in the edge server 300 the GPU 217 or to use the GPU 217 of a different performance.

(Smartphone)

Figure 3:
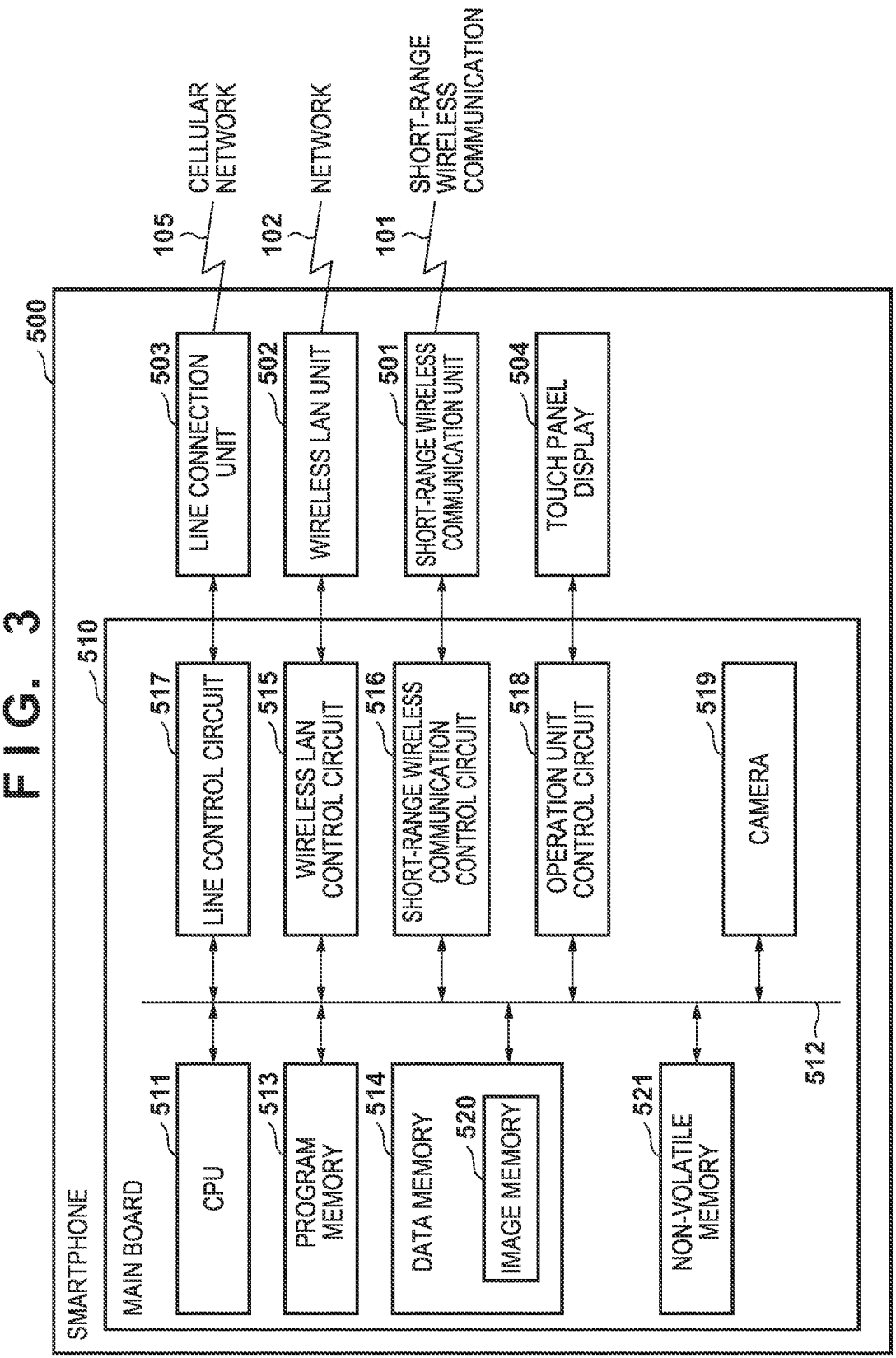
FIG. 3 is a view for illustrating an example of a hardware configuration of a smartphone according to the embodiment of the invention of the present application.

FIG. 3 is a block diagram for illustrating an example of a hardware configuration of the smartphone 500 according to the present embodiment. The smartphone 500 is configured to include a main board 510 for performing the control of an entire apparatus, a wireless LAN unit 502, a short-range wireless communication unit 501, a line connection unit 503, and a touch panel display 504. On the main board 510, a CPU 511 operates in accordance with a control program that is stored in a ROM program memory 513 and content of a RAM data memory 514, which are connected via an internal bus 512. The CPU 511, by controlling the wireless LAN unit 502 via a wireless LAN control circuit 515, performs wireless LAN communication with another communication terminal apparatus.

The CPU 511, by controlling the short-range wireless communication unit 501 via a short-range wireless communication control circuit 516, is able to detect a connection with another short-range wireless communication terminal and perform transmission/reception of data to/from the other short-range wireless communication terminal. Also, the CPU 511, by controlling the line connection unit 503 via a line control circuit 517, is able to connect to the cellular network 105 and perform a phone call and data transmission/reception. The CPU 511, by controlling an operation unit control circuit 518, is able to perform a desired display on the touch panel display 504 and receive an operation from the user. The CPU 511 is able to control a camera unit 519 to capture an image and store the captured image in an image memory 520 within the data memory 514. Also, aside from a captured image, it is possible to store in the image memory 520 an image obtained from an external unit via a cellular line, the LAN 102, and the short-range wireless communication 101, or conversely, transmit to an external unit.

A non-volatile memory 521 is configured by a flash memory and the like and stores data to be stored even after the power has been turned off. For example, aside from telephone book data, each type of communication connection information, information of devices to which a connection was made in the past, and the like, image data to be stored, application software for realizing each type of function in the smartphone 500, and the like may also be stored in the non-volatile memory 521.

(Printer)

Figure 4:
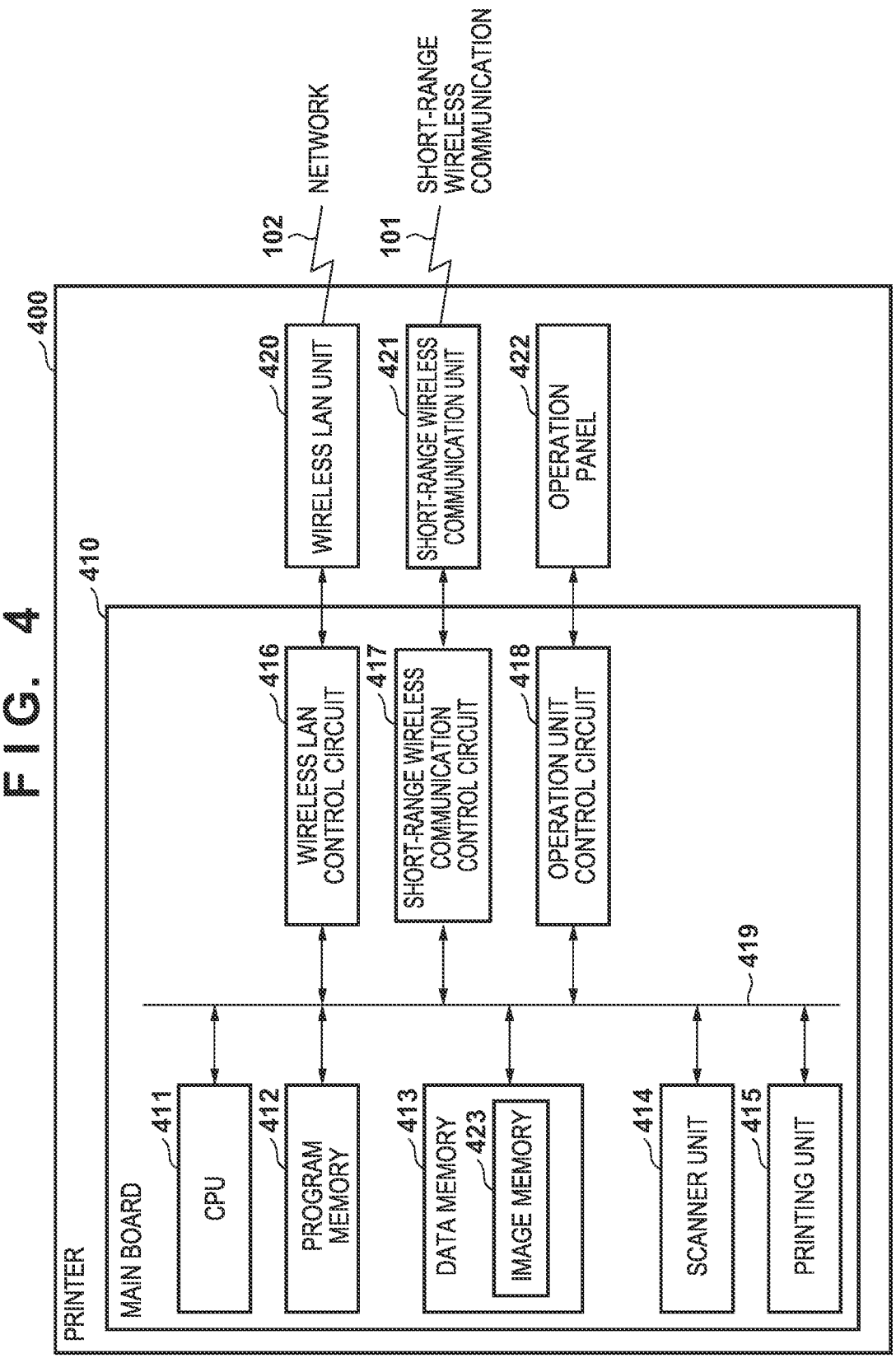
FIG. 4 is a view for illustrating an example of a hardware configuration of a printer according to the embodiment of the invention of the present application.

FIG. 4 is a block diagram for illustrating an example of a hardware configuration of the printer 400, which is an image processing apparatus, according to the present embodiment.

The printer 400 is configured to include a main board 410 for performing the control of an entire apparatus, a wireless LAN unit 420, a short-range wireless communication unit 421, and an operation panel 422. On the main board 410, a CPU 411 operates in accordance with a control program that is stored in a ROM program memory 412 and content of a RAM data memory 413, which are connected via an internal bus 419. The CPU 411 controls a scanner unit 414 in order to read and store in an image memory 423 within the data memory 413 a document such as a paper. Also, the CPU 411 controls a printing unit 415 in order to print on a printing medium an image of the image memory 423 within the data memory 413.

The CPU 411, by controlling the wireless LAN unit 420 via a wireless LAN communication control circuit 416, performs wireless LAN communication with another communication terminal apparatus. The CPU 411, by controlling the short-range wireless communication unit 421 via a short-range wireless communication control circuit 417, is able to detect a connection with another short-range wireless communication terminal and to perform transmission/reception of data to/from the other short-range wireless communication terminal. The CPU 411, by controlling an operation unit control circuit 418, is able to perform a display of the state of the printer 400 and a display of a function selection menu as well as accept an operation from the user on the operation panel 422.

(Printing Unit)

Figure 5:
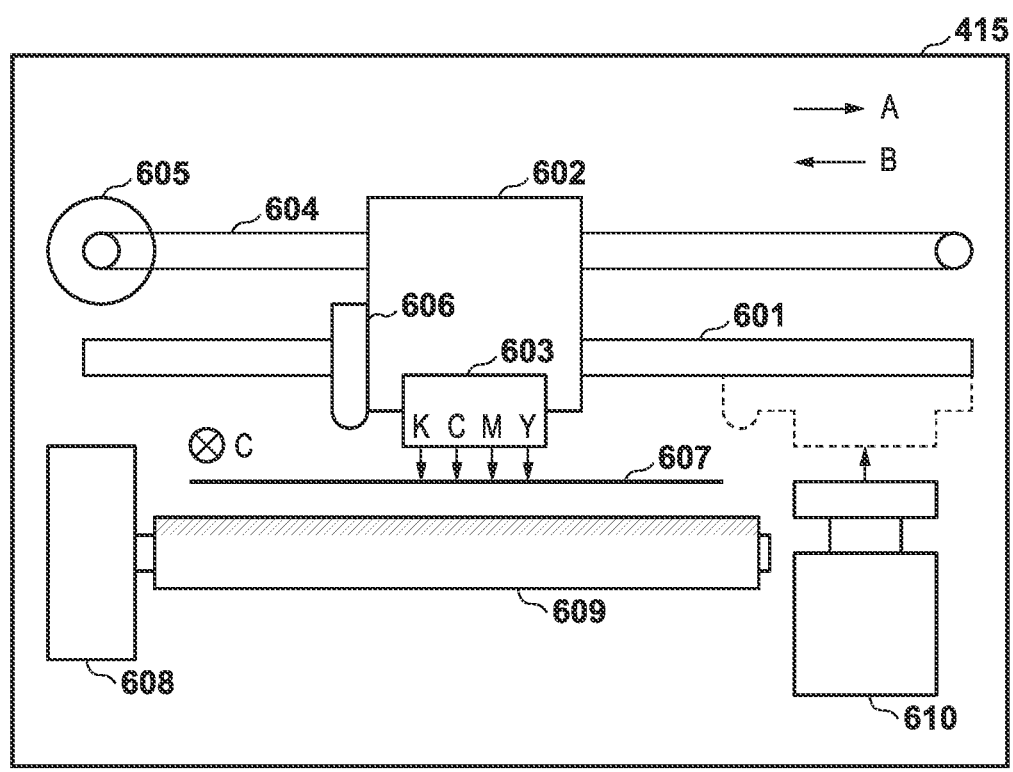
FIG. 5 is a view for illustrating an overview of a configuration of a printing unit of the printer according to the embodiment of the invention of the present application.

FIG. 5 is a view for illustrating an overview of a configuration of the printing unit 415 of the printer 400. An inkjet printhead (hereinafter, simply printhead) 603 having a nozzle array of colors (black (K), cyan (C), magenta (M), and yellow (Y)) is provided on a carriage 602 that moves back and forth in directions of arrow symbols A and B on a guide shaft 601. Note that although in the present embodiment, an example in which ink of four colors (K, C, M, and Y) is used is indicated, the number of supported ink colors is not limited to this. The carriage 602 is moved along the guide shaft 601 by a carriage motor 605 which is connected via the carriage 602 and a belt 604. Also, by applying a driving pulse to the printhead 603 in accordance with a movement, a single scan print operation is performed.

A sensor 606 is arranged in a position that is aligned with the printhead 603 on the carriage 602. By detecting/monitoring a printing medium 607 by the sensor 606 while moving the carriage 602, it is possible to read a result (image) printed by the printhead 603. The printing medium 607 is conveyed by a predefined amount in a direction of an arrow C by a conveyance roller 609 which is driven by a conveyance motor 608 for every single scan print operation of the carriage 602. In other words, a direction C is a conveyance direction of the printing medium 607. By repeating this, one page worth of a print operation is completed in relation to the printing medium 607.

Also, at a position away from the printing medium 607 in the direction of the arrow A, a recovery mechanism 610 for maintaining the printhead 603 in a good condition is arranged facing the printhead 603. After the printhead 603 moves the carriage 602 to a position facing the recovery mechanism 610, the recovery mechanism 610 is driven. By this, it is possible to perform a cleaning operation of the printhead 603 that removes clogging, removes color mixing between the colors, and the like. As the cleaning operation, aside from a standard cleaning operation, a plurality of cleaning operations, such as powerful cleaning which sucks ink within a nozzle of the printhead 603 more strongly, can be performed. Content of a cleaning operation is not particularly limited and may be conducted as necessary from among the plurality of cleaning operations.

Also, by bringing the recovery mechanism 610 in contact with the printhead 603 in a case where a print operation has not been performed for a long time, the nozzle unit of the printhead 603 can be capped in order to prevent drying or solidification of ink. In the following, this is described as "capping". These cleaning operations and the capping operation are executed automatically in accordance with operation control of the printer 400 and are controlled so as to maintain optimum print quality. Meanwhile, in a case where the ink is faint or irregular, the user is able to select, from the operation panel 422 and the like of the printer 400, to execute a maintenance operation.

(Printer Operation Screen)

Figure 6A:
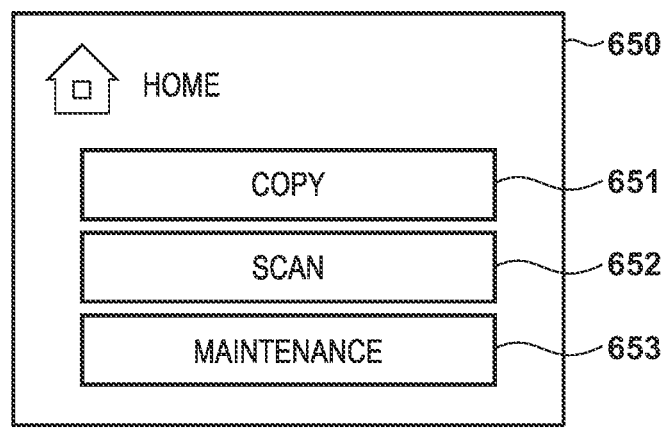
FIG. 6A, FIG. 6B, and FIG. 6C are views for illustrating examples of operation screens of the printer according to the embodiment of the invention of the present application.
Figure 6B:
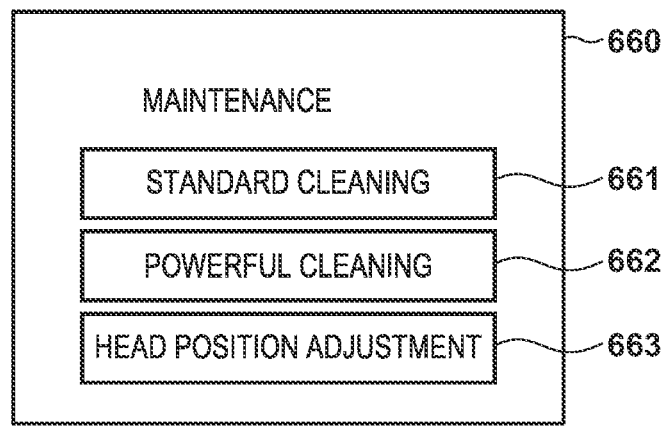
Figure 6C:
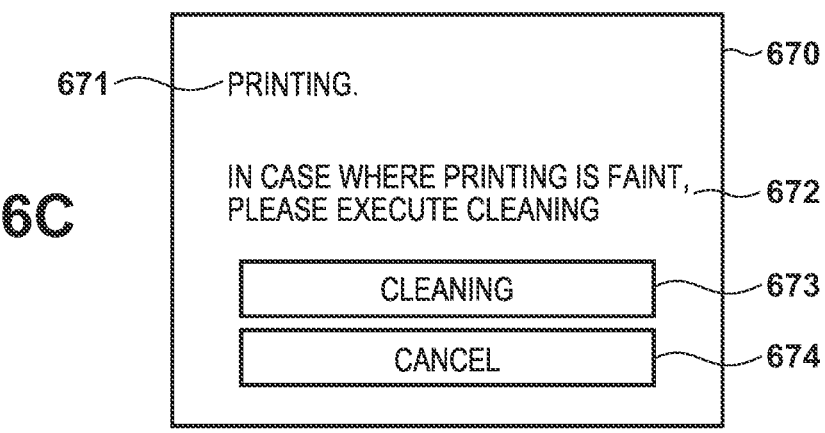

FIGS. 6A to 6C are views for illustrating configuration examples of operation screens displayed on the operation panel 422 of the printer 400 of the present embodiment. Note that the operation screen of the printer 400 may be configured to be displayed on a display unit (touch panel display 504) of the smartphone 500.

FIG. 6A illustrates an example of a home screen 650. Each type of a button for selecting a function to execute is arranged on the home screen 650. When a copy button 651 is pressed, the printer 400 executes a copy function. When a scan button 652 is pressed, the printer 400 executes a scan function. Also, when a maintenance button 653 is pressed, the printer 400 displays a maintenance screen 660 illustrated in FIG. 6B and then executes a maintenance function of the printhead 603. Note that in a case where there is a function that can be executed aside from the above functions, a button may be added onto the home screen 650, and the home screen may be configured by a plurality of screens so that a function is selected while switching the screens as though turning a page. For example, rather than immediately starting a copy operation when the copy button 651 is pressed, a configuration may be taken so as to display a screen for performing a setting for a sheet size or a copy count, receive a start operation therefrom, and then start a copy operation.

FIG. 6B illustrates an example of the maintenance screen 660. The maintenance screen 660 is displayed when the maintenance button 653 that is arranged on the home screen 650 is pressed. Each type of a button for selecting a maintenance function to execute is arranged on the maintenance screen 660. When a standard cleaning button 661 is pressed, the printer 400 controls the recovery mechanism 610 and then executes a standard cleaning operation. When a powerful cleaning button 662 is pressed, the printer 400 controls the recovery mechanism 610 and then executes a more powerful cleaning operation. A difference between a standard cleaning operation and a powerful cleaning operation may be that types of executed cleaning operations are different or that execution time or intensity of cleaning operations is different. When a head position adjustment button 663 is pressed, the printer 400 performs an adjustment that relates to a position shift of the nozzle array of each color arranged in the printhead 603.

FIG. 6C illustrates an example of a printing-in-progress screen 670. On the printing-in-progress screen 670, a state display unit 671 for indicating that printing is in progress is arranged. A guide message display unit 672 is arranged under the state display unit 671, and here, in a case where printing by the printhead 603 is faint during printing, a message prompting to execute cleaning is displayed. Note that content that is displayed on the guide message display unit 672 is not limited to this and may be another message. When a cleaning button 673 is pressed, the printer 400 executes a cleaning operation at a good timing such as between the pages of a print job. Also, when a cancel button 674 is pressed, the printer 400 suspends the print job that is being executed and then returns to a display of the home screen 650.

[Software Configuration]

FIG. 7 is a view for illustrating an example of a software configuration of each apparatus that configures the processing system 100 according to the present embodiment. Here, among those in the software configuration, only those related to learning and estimation processing according to the present embodiment are described, and other software modules are not illustrated. For example, OS, each type of middleware, and applications for maintenance, and the like that operate on each device or server are omitted from being illustrated.

The cloud server 200 comprises a learning data generation unit 250, the learning unit 251, and a learning model 252. The learning data generation unit 250 is a module for generating learning data that can be processed by the learning unit 251 from data that is received from an external unit. Learning data is a set of input data X of the learning unit 251 and supervised data T indicating a correct answer of a result of learning. The learning unit 251 is a program module for executing learning that relates to the learning model 252 using learning data received from the learning data generation unit 250. The learning model 252 accumulates the result of learning performed in the learning unit 251. An example in which the learning model 252 is realized as a neural network will be described here. By optimizing a weighting parameter between each node of the neural network, input data can be classified or an evaluation value can be determined. The learning model 252 accumulated as a result of learning is distributed to the edge server 300 as a learned model and is used for estimation processing in the edge server 300.

The edge server 300 comprises a data collection/provision unit 350, an estimation data generation unit 353, the estimation unit 351, and a learned model 352. The data collection/provision unit 350 is a module for receiving data and collecting and storing log information from an external apparatus (for example, the printer 400). Also, the data collection/provision unit 350 passes to the estimation data generation unit 353 and transmits to the cloud server 200 these sets of data as a data group to use for learning. The estimation data generation unit 353 is a module for generating estimation data that can be processed by the estimation unit 351 from the data passed from the data collection/provision unit 350. The estimation data is the input data X of the estimation unit 351.

The estimation unit 351 is a program module for executing estimation processing using the learned model 352 based on the estimation data passed from the estimation data generation unit 353 and then returning to the printer 400 the result thereof. Data received from the printer 400 is data to be the input data X of the estimation unit 351. The learned model 352 is used in the estimation processing performed in the edge server 300. Assume that the learned model 352 is realized as a neural network similarly to the learning model 252. The learned model 352 may be the same as the learning model 252 or may extract and use a portion of the learning model 252. The learned model 352 stores the learning model 252 which was accumulated and distributed in the cloud server 200. The learned model 352 may distribute the entire learning model 252 or may extract and distribute only a portion of the learning model 252 necessary for an estimation by the edge server 300.

The printer 400 comprises an application unit 450 and a data transceiver unit 451. The application unit 450 is a module for realizing each type of function that is executed by the printer 400 and is a module that uses a learning/estimation mechanism of machine learning. The data transceiver unit 451 is a module for requesting learning or an estimation to the edge server 300. During learning, upon a request from the application unit 450, the data transceiver unit 451 transmits data to be used for learning to the data collection/provision unit 350 of the edge server 300. Also, during an estimation, upon a request from the application unit 450, the data transceiver unit 451 transmits data to be used in the estimation to the edge server 300 and then returns the received result to the application unit 450.

Note that although it is indicated in the present embodiment that a mode in which the result of the learning processing by the cloud server 200 is distributed to the edge server 300 as the learned model 352 and is used for an estimation, no limitation is made to this mode. Which of the cloud server 200, the edge server 300, and the printer 400 is to execute learning and an estimation can be determined in accordance with a distribution of hardware resources, a calculation amount, and a size of a data communication amount. Alternatively, a configuration may be taken so as to change dynamically in accordance with the distribution of the resources, the calculation amount, and the increase/decrease in the data communication amount. In a case in which learning and an estimation are to be performed by different agents, a configuration may be taken so as to, on the estimation side, reduce the logic to only what is used in the estimation and reduce the size of the learned model 352 and to execute the estimation at a higher speed.

[Learning]

Figure 8A:
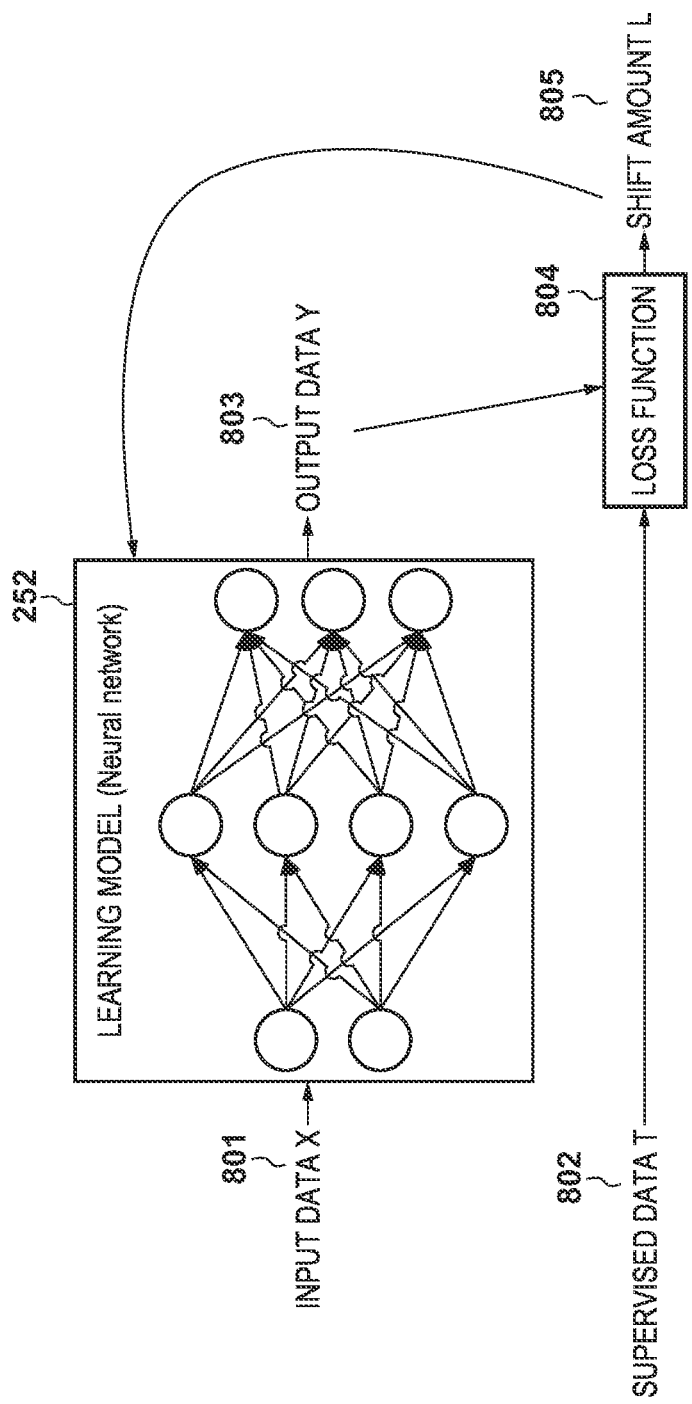
FIG. 8A and FIG. 8B are views for describing conceptual configurations of inputs/outputs of a learning model and a learned model according to the invention of the present application.
Figure 8B:
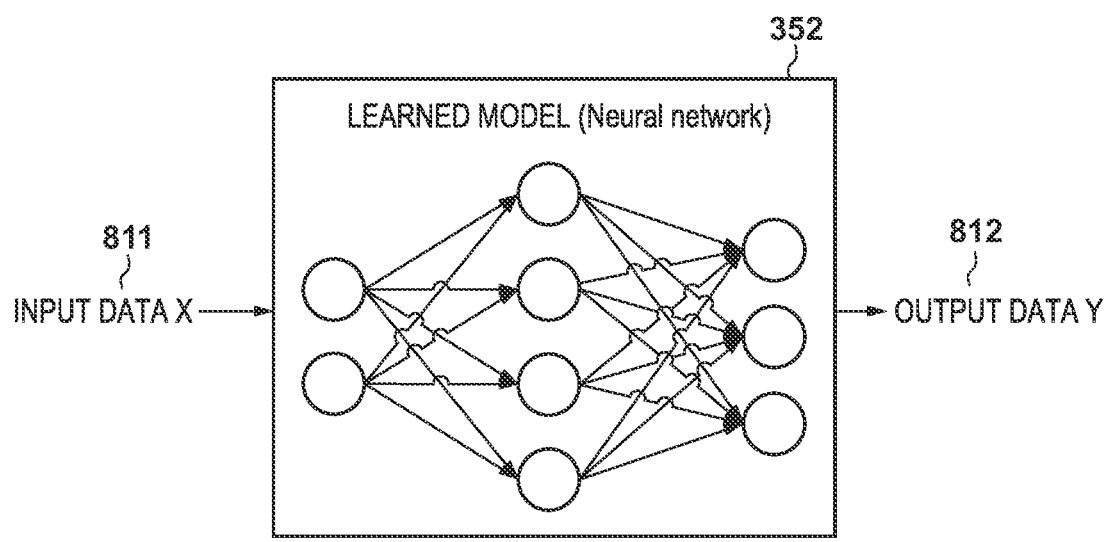

FIGS. 8A and 8B are schematic diagrams for describing structures for inputs/outputs when using the learning model 252 and the learned model 352. The learning model 252 and the learned model 352 according to the present embodiment are configured by a neural network and are configured to include an input layer, a hidden layer, and an output layer.

FIG. 8A illustrates a relationship of the learning model 252 and the input/output data thereof during learning. Input data X 801 is data that is inputted into an input layer of the learning model 252. Details of the input data X 801 according to the present embodiment will be described later. As a result of processing the input data X 801 using the learning model 252 which is a machine-learning model, output data Y 803 is outputted. During learning, supervised data T 802 is provided as correct answer data of a recognition result of the input data X 801, the output data Y 803 and the supervised data T 802 are provided to a loss function 804, and by comparing these, a shift amount L 805 from the correct answer of the recognition result is acquired. A combine-weighting coefficient and the like between the nodes of a neural network within the learning model 252 are updated so as to reduce the shift amount L 805 in relation to a large amount of learning data. For example, an error backpropagation method is a method for adjusting the combine-weighting coefficient and the like between the nodes of each neural network so as to reduce the above error. As specific algorithms of machine learning, the nearest neighbor method, the naive Bayes method, the decision tree method, a support vector machine, and the like may be given. Also, deep learning for self-generating feature amounts and combine-weighting coefficients for learning using the neural network may be used. No limitation is made in particular to the learning method and the algorithm, and what is usable among machine learning algorithms may be used and applied the present embodiment as appropriate.

FIG. 8B illustrates a relationship of the learned model 352 and the input/output data thereof during estimation. Input data X 811 is data that is inputted into an input layer of the learned model 352. Details of the input data X 811 according to the present embodiment will be described later. As a result of processing the input data X 811 using the learned model 352 which is a machine-learning model, output data Y 812 is outputted. During estimation, this output data Y 812 is used as an estimation result. Note that although it was described that the learned model 352 during estimation comprises the same neural network as that of the learning model 252 during learning, it is also possible to prepare as the learned model 352 extracting only a portion necessary for an estimation. By this, it becomes possible to reduce the data amount of the learned model 352 and shorten the neural network processing time during estimation.

As processing according to the present embodiment, a case where a timing when a maintenance becomes necessary during an execution of a print job or copying is estimated using a learned model acquired by machine learning and then a maintenance operation is automatically executed in advance will be described.

[Data Structure]

(Print Job)

Figure 9A:
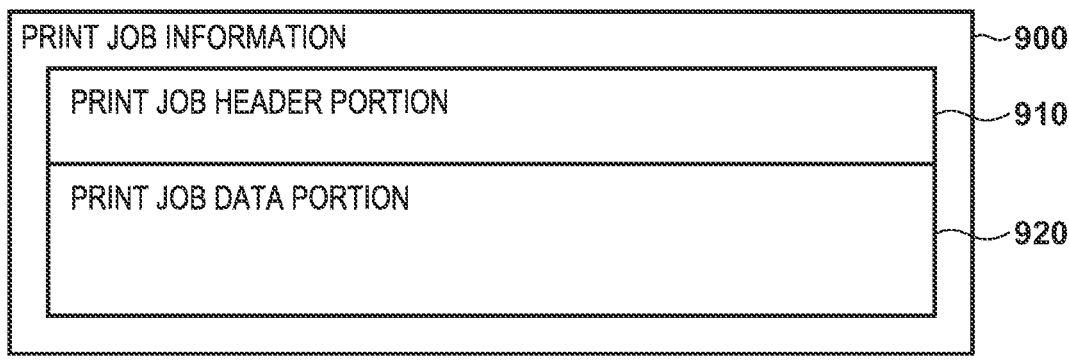
FIG. 9A, FIG. 9B, and FIG. 9C are views for illustrating examples of data structures of a print jobs according to the embodiment of the invention of the present application.
Figure 9B:
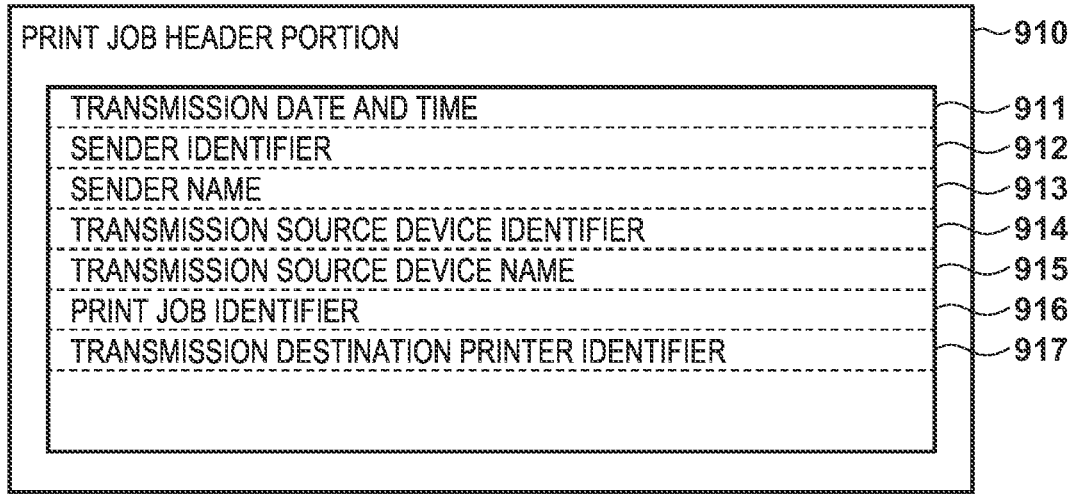
Figure 9C:
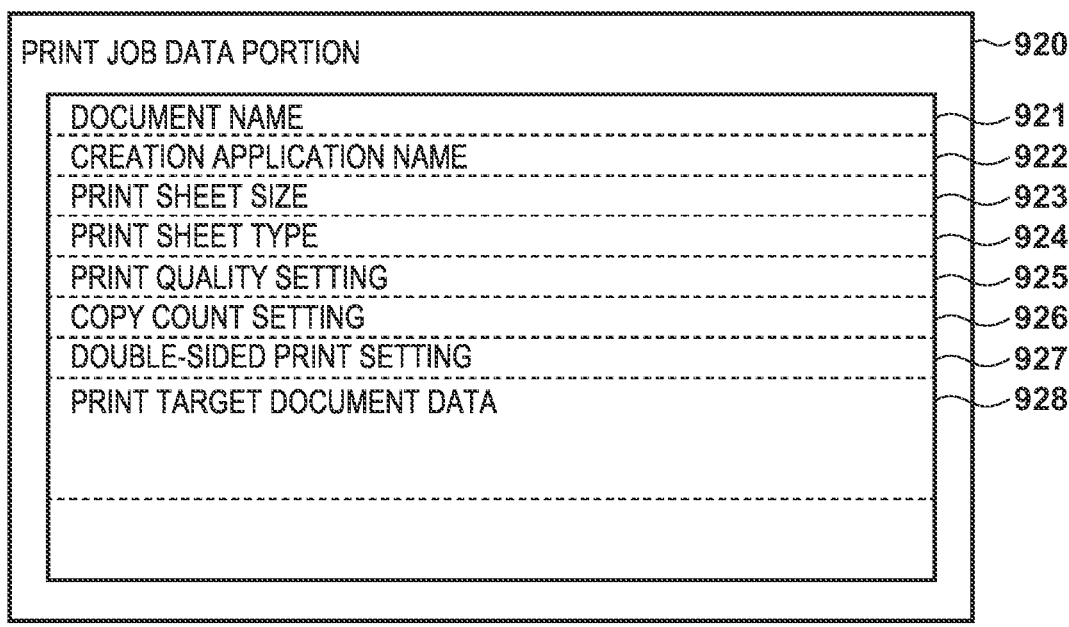

FIGS. 9A to 9C are views for illustrating examples of data structures of a print job 900 according to the present embodiment. The print job 900 is data that is transmitted in relation to the printer 400 in order to instruct an execution of printing in relation to the printer 400 from a terminal apparatus such as the smartphone 500. Also, a data structure of the print job 900 is used for transmitting information related to a print job as input data for learning in relation to the cloud server 200 and the edge server 300.

FIG. 9A illustrates the entire structure of the print job 900. The print job 900 is configured to include a print job header portion 910 and a print job data portion 920. In the print job header portion 910, information related to a transmission source and a transmission destination of a print job is stored. In the print job data portion 920, information necessary for executing a print job is stored.

FIG. 9B illustrates details of information included in the print job header portion 910. A transmission date and time 911 indicates a date and time that a print job was transmitted from a transmission source. As date and time information, information indicating the year, month, date, hours, minutes, and seconds may be used, and time information in smaller units such as milliseconds may be included as necessary. A sender identifier 912 is an identifier for uniquely identifying a user of a transmission source. The sender identifier 912 corresponds to user login name that relates to a transmission source device and the like. A sender name 913 is a particular text string used for a purpose such as displaying the name of a user of a transmission source. A transmission source device identifier 914 is an identifier for uniquely identifying a terminal device that is the transmission source. The transmission source device identifier 914 corresponds to an IP address, a MAC address, and the like.

A transmission source device name 915 is a particular text string used for a purpose such as displaying the name of the transmission source device. A print job identifier 916 is an identifier for uniquely identifying the print job 900. By combining as appropriate the print job identifier 916, the transmission source device identifier 914, and the sender identifier 912, it becomes possible to identify one of a large number of print jobs 900 collected in the cloud server 200.

A transmission destination printer identifier 917 is an identifier for uniquely identifying the printer 400 which is a destination to which the print job 900 is transmitted. In other words, the transmission destination printer identifier 917 indicates the printer 400 for executing a print job and performing printing.

FIG. 9C illustrates details of information included in the print job data portion 920. A document name 921 is a particular text string for indicating the name of a print target document of a print job. A creation application name 922 is a particular text string for indicating the name of an application that created a print target document. A print sheet size 923 is setting information related to a size of a sheet to be printed. A size that is used for printing documents such as A3, A4, A5, B4, and B5, a size that is used for photography printing such as photo L and photo 2L, a size such as a postcard and envelope, and the like may be given as a sheet size. A sheet size is designated by a method such as having the user select from among sheet sizes that are supported by the printer 400 to be used. A print sheet type 924 is setting information related to a type of a sheet to be printed. As a sheet type, various types such as a plain paper, a photo paper, and a kraft paper may be given. The sheet type is designated by a method such as having the user select from among sheet types that are supported by the printer 400 to be used.

A print quality setting 925 is setting information related to the quality of a print product. As the print quality setting 925, things such as printing at a high speed at the expense of lowering the quality and printing at a high quality even if it takes slightly more printing time can be designated. A copy count setting 926 is setting information related to the number of copies of a print product. For example, it is possible to send one set of print target document data and then perform printing of a plurality of copies using the print target document data. A double-sided print setting 927 is setting information related to double-sided printing. By the double-sided print setting 927, it is possible to designate things such as positioning and printing the document to be printed on one side of the print sheet or positioning and printing on both sides of the print sheet. Print target document data 928 is data indicating content for which printing is performed. For printing of a document, it may be text data or image data of each page configuring the document, and for photography printing, it may be image data. Note that the above content is an example, it is not always necessary to include everything that was given above, and it is also possible to include information aside from the above.

(Job Log Information)

FIGS. 10A to 10C are views for illustrating data structures of job log information for each type of a job. A data structure of job log information is used for transmitting to the edge server 300 information of a job that was executed by the printer 400. The job log information transmitted to the edge server 300 is used as input data when estimating. Also, job log information is used as input data and supervised data when learning on the cloud server 200.

FIG. 10A illustrates a configuration example of print job log information 940 which is job log information during an execution of a print job. A log identifier 941 is an identifier for uniquely identifying job log information. Job type information 942 indicates a job type of job log information, and the job type information 942 in the print job log information 940 indicates that it is a "print". A job start date and time 943 and a job end date and time 944 each store a start date and time and an end date and time of the print job. A printer identifier 945 is an identifier for uniquely identifying the printer 400.

Print job header information 946 and print job data information 947 store content of the print job header portion 910 and the print job data portion 920 of the executed print job 900. Here, although it is made so that all the content of the print job header portion 910 and the print job data portion 920 are stored, a configuration may be taken so as to store to job log information only necessary information in order to reduce the size of the job log information. Because the size of the print target document data 928 of the print job data portion 920 is especially large, a configuration may be taken so as not to include it in the job log information. A color page count 948 stores the number of printed color pages as a result of the printer 400 executing an operation of the print job 900. A monochrome page count 949 stores the number of printed monochrome pages as a result of the printer 400 executing an operation of the print job 900. An ink usage amount 950 stores the measured amount of ink used for printing by color as a result of the printer 400 executing an operation of the print job 900. The value of the ink usage amount 950 may be counted by counting the number of ink dots that were discharged from the printhead 603 during printing.

FIG. 10B illustrates a configuration example of copy job log information 960 which is job log information during an execution of a copy. A log identifier 961 is an identifier for uniquely identifying job log information. Job type information 962 indicates a job type of job log information, and the job type information 962 in the copy job log information 960 indicates that it is a "copy". A job start date and time 963 and a job end date and time 964 each store a start date and time and an end date and time of a copy operation. A printer identifier 965 is an identifier for uniquely identifying the printer 400. A sheet size 966 is sheet size setting information of a print sheet used during an execution of copying.

A sheet type 967 is sheet type setting information of a print sheet used during an execution of copying. A print quality setting 968 is print quality setting information used during an execution of copying. A copy count setting 969 is copy count setting information used during an execution of copying. A double-sided print setting 970 is double-sided print setting information used during an execution of copying. A color page count 971 stores the number of printed color pages as a result of executing a copy operation. A monochrome page count 972 stores the number of printed monochrome pages as a result of executing a copy operation. An ink usage amount 973 stores the measured amount of ink used for printing by color as a result of executing a copy operation.

FIG. 10C illustrates a configuration example of maintenance job log information 980 which is job log information during an execution of maintenance. A log identifier 981 is an identifier for uniquely identifying job log information. Job type information 982 indicates a job type of job log information, and the job type information 982 in the maintenance job log information 980 indicates that it is "maintenance". A job start date and time 983 and a job end date and time 984 each store a start date and time and an end date and time of the maintenance operation. A printer identifier 985 is an identifier for uniquely identifying the printer 400. A maintenance type 986 indicates whether the executed maintenance operation is of a type that was executed due to the user selecting a maintenance execution from the operation panel 422 of the printer 400 or a type that is not a user operation and was executed automatically. A cleaning type 987 is what kind of maintenance was executed and indicates the type of cleaning. Although a value that the cleaning type 987 may take on may be standard cleaning, powerful cleaning, capping, capping cancellation, and the like, it may be set in accordance with a maintenance operation that can be executed by the printer 400.

(Training Request)

Figure 11:
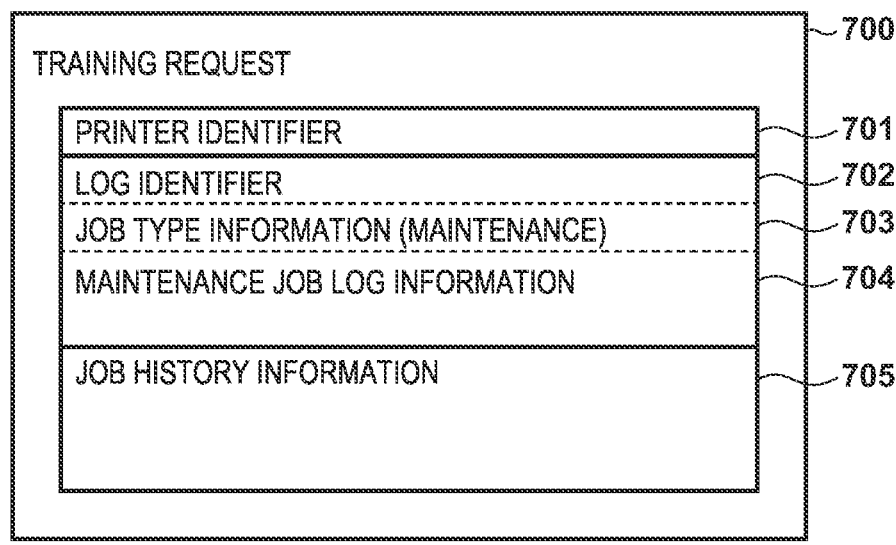
FIG. 11 is a view for illustrating an example of a data structure of a training request according to an embodiment of the invention of the present application.

FIG. 11 is a view for illustrating an example of a data structure of a training request according to the present embodiment. The data structure of a training request is used when performing a training request in relation to the cloud server 200 from the printer 400 or the edge server 300. Learning according to the present embodiment is performed when the user instructs to execute a maintenance in relation to the printer 400. Assume that this is a case where the user instructed to execute a maintenance as printing was faint or irregular due to some kind of a malfunction occurring in the printhead 603.

A training request 700 is configured to include a printer identifier 701, a log identifier 702, job type information 703, maintenance job log information 704, and job history information 705. As the maintenance job log information 704, the job log information of a maintenance that was selected and then executed at the time is included. Also, as the job history information 705, information for acquiring an operation history up to when an execution of a maintenance becomes necessary is included. Assume that in the present embodiment, a log identifier of the job log information that occurred in the period after executing the last maintenance up to when the latest maintenance execution was instructed is tabulated and then is passed as the job history information 705. Note that instead of tabulating and storing the log identifier, a configuration may be taken so as to store as the job history information 705 the entire job log information. Also, in a case where it is difficult to hold and store all the job history information 705, a configuration may be taken so as to only store a job history within a fixed period.

(Estimation Request)

Figure 12A:
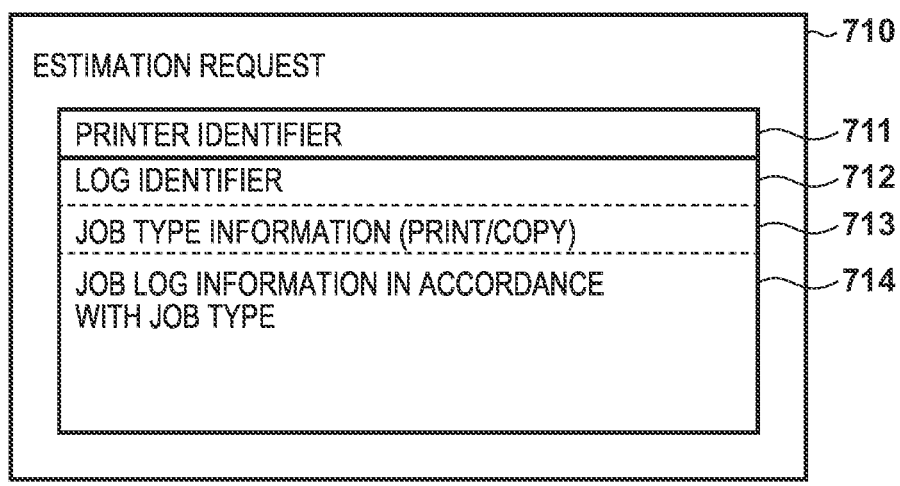
FIG. 12A and FIG. 12B are views for illustrating examples of data structures of an estimation request and an estimation result response according to the embodiment of the invention of the present application.
Figure 12B:
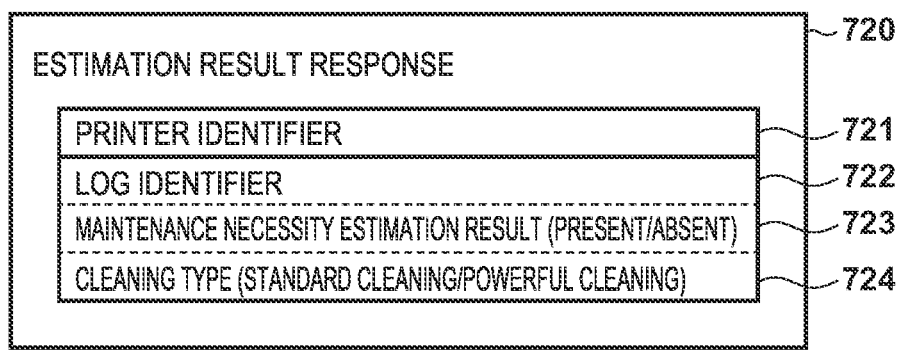

FIGS. 12A and 12B are views for illustrating examples of data structures of an estimation request and an estimation result response according to the embodiment. Data structures of an estimation request and an estimation result response are used when making an estimation request from the printer 400 to the edge server 300 and receiving a response thereto. The estimation request according to the present embodiment is performed in order to find out whether or not a maintenance operation will be necessary when executing a print job or a copy operation in the period up to the execution of the job thereof is completed.

FIG. 12A illustrates an example of a data structure of an estimation request 710 that is transmitted in relation to the edge server 300 from the printer 400. The estimation request 710 is configured to include a printer identifier 711, a log identifier 712, job type information 713, and job log information 714. As the job log information 714, job log information that corresponds to a print job or a copy job that is to be executed is included. Accordingly, in the job log information here, information (for example, a job start date and time and a job end date and time) defined in accordance with the completion of processing may be blank.

FIG. 12B illustrates an example of a data structure of an estimation result response 720 for returning to the printer 400 a result of performing an estimation on the edge server 300 and the cloud server 200. The estimation result response 720 is configured to include a printer identifier 721, a log identifier 722, an estimation result 723, and a cleaning type 724. The estimation result 723 indicates a result of estimating a presence or absence of necessity for a maintenance, and assume that a value of "present" or "absent" is set here. The cleaning type 724 stores information of a cleaning type to be necessitated and for example, in a case where a result is "present" in the estimation result 723 of cleaning, "standard cleaning", "powerful cleaning", and the like are stored.

[Learning/Estimation]

Figure 13:
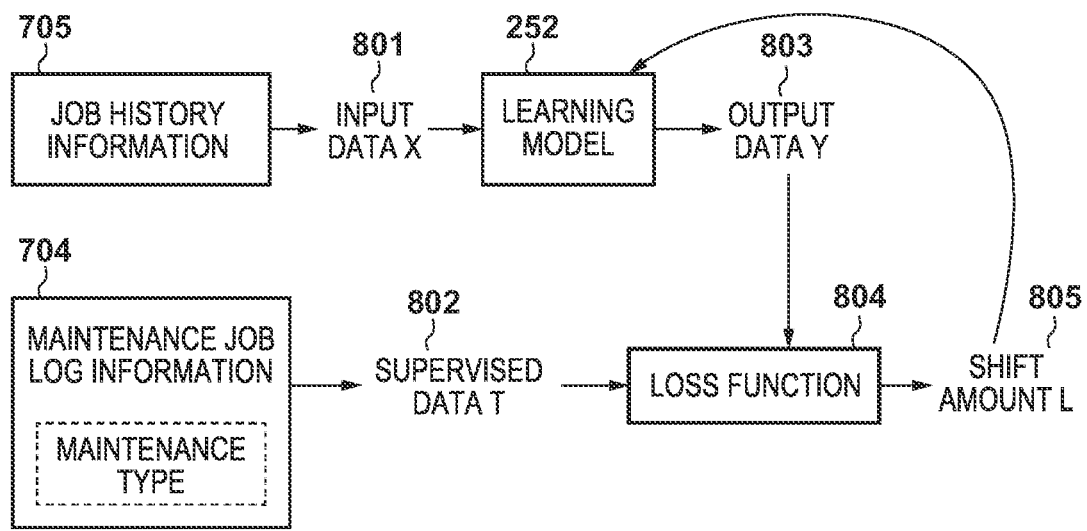
FIG. 13 is a view for describing inputs/outputs of data during learning and during an estimation in the invention of the present application.

FIG. 13 is a view for illustrating a structure of inputs/outputs of the learning model 252 during learning. As illustrated in FIG. 13, the input data X 801 is generated from the job history information 705 passed by the training request 700 and then is used. As the input data X 801, specifically, job log information that is saved in the edge server 300 may be extracted from the job history information 705 (log identifier), and a parameter such as the following may be calculated and then used.

Printer identifier: Because the printer identifiers 945, 965, and 985 are stored in each set of the job log information illustrated in FIGS. 10A to 10C, these sets of identification information can be acquired and then included in the input data X 801. By including a printer identifier in the input data X 801, learning suitable for the printer 400 can be performed. Meanwhile, by not including printer identifier in the input data X 801, a plurality of printers can be made to learn the same characteristics.

Elapsed time from when printing was last ended: This information can be acquired by the following method. First, the last-performed print job log information 940 or copy job log information 960 is acquired from the job log information of the printer 400. Then, a difference between the job end date and time 944 or the job end date and time 964 stored in the acquired print job log information 940 or the copy job log information 960 and a current time is calculated.

Number of times printing was performed on or after a recovery operation was last performed: This information can be acquired by the following method. The maintenance job log information 980 including "standard cleaning" or "powerful cleaning" as the cleaning type 987 is extracted from the job log information. Among those, the one whose job end date and time 984 is the latest is the maintenance job log information 980 of the recovery operation that was last performed. Next, the print job log information 940 or copy job log information 960 performed on or after the maintenance job log information 980 is completely extracted. The number of extracted print job log information 940 and copy job log information 960 is counted.

Number of pages printed on or after a recovery operation was last performed: This information can be acquired by the following method. The maintenance job log information 980 including "standard cleaning" or "powerful cleaning" as the cleaning type 987 is extracted from the job log information. Among those, the one whose job end date and time 984 is the latest is the maintenance job log information 980 of the recovery operation that was last performed. Next, the print job log information 940 or copy job log information 960 performed on or after the maintenance job log information 980 is completely extracted. A sum total of a numerical value stored in the color page counts 948 and 971 and the monochrome page counts 949 and 972 of the extracted print job log information 940 and copy job log information 960 is calculated. Note that a color page count and a monochrome page count may be calculated separately and then used.

The ink usage amount used in printing performed on or after a recovery operation was last performed: This information can be acquired by the following method. The maintenance job log information 980 including "standard cleaning" or "powerful cleaning" as the cleaning type 987 is extracted from the job log information. Among those, the one whose job end date and time 984 is the latest is the maintenance job log information 980 of the recovery operation that was last performed. The print job log information 940 or copy job log information 960 performed on or after the maintenance job log information 980 is completely extracted. A sum total of a numerical value stored in the ink usage amounts 950 and 973 of the extracted print job log information 940 and copy job log information 960 is calculated.

Ink usage density in last printing: This information can be acquired by the following method. First, the print job log information 940 or the copy job log information 960 is acquired from the job log information last performed. A numerical value stored in the ink usage amounts 950 and 973 of the print job log information 940 or the copy job log information 960 is set as the ink usage amount. The sum of the color page counts 948 and 971 and the monochrome page counts 949 and 972 of the same print job log information 940 and copy job log information 960 is made to be the page count. By dividing the ink usage amount by the page count, an ink usage density per page is calculated. Note that although the calculation here is regarding the last printing, a configuration may be taken so as to cumulatively calculate regarding all the printing that was performed subsequently to the recovery operation that was last performed.

Type of a cleaning operation that was last performed: This information can be acquired by the following method. The maintenance job log information 980 including "standard cleaning" or "powerful cleaning" as the cleaning type 987 is extracted from the job log information. Among those, the one whose job end date and time 984 is the latest is the maintenance job log information 980 of the recovery operation that was last performed. The cleaning type 987 of this maintenance job log information 980 is acquired. The cleaning type 987 that is allocated with a serial number and is digitized may be used as an input parameter, or an intensity or a degree of cleaning which takes on a predetermined value for each cleaning type may be digitized and then used as a parameter. Specifically, a strength of negative pressure or a period and number of times negative pressure is applied when performing suction of a nozzle of the printhead 603 by the recovery mechanism 610, or a calculation result such as a product of these numeric values may be used. Also, although a cleaning operation was given as an example here, another maintenance operation may be targeted.

Amount of time the printhead was not used in a capped state subsequently to a recovery operation that was last performed: This information can be acquired by the following method. The maintenance job log information 980 including "standard cleaning" or "powerful cleaning" as the cleaning type 987 is extracted from the job log information. Among those, the one whose job end date and time 984 is the latest is the maintenance job log information 980 of the recovery operation that was last performed. The maintenance job log information 980 that was performed subsequently to this maintenance job log information 980 of the recovery operation that was last performed and whose cleaning type 987 is "capping" or "capping cancellation" is extracted. By calculating a time interval of the extracted "capping" and "capping cancellation" of the maintenance job log information 980, the amount of time the printhead 603 was not used in a capped state can be calculated. Note that capping non-use time may use as a parameter a sum total of the amount of time of non-use in a capped state subsequent to the recovery operation that was last performed, or may use as a parameter the longest time of non-use in the capped state.

Amount of time the printhead not used in a non-capped state: This information can be acquired by the following method. The maintenance job log information 980 including "standard cleaning" or "powerful cleaning" as the cleaning type 987 is extracted from the job log information. Among those, the one whose job end date and time 984 is the latest is the maintenance job log information 980 of the recovery operation that was last performed. The maintenance job log information 980 that was performed subsequently to this maintenance job log information 980 and whose cleaning type 987 is "capping" or "capping cancellation" is extracted. By calculating a time interval of the extracted "capping" and "capping cancellation" of the maintenance job log information 980, the amount of time of non-use in a non-capped state can be calculated. Note that for the non-use time in the non-capped state, a sum total of the amount of time of non-use in a non-capped state from the recovery operation that was last performed may be used as a parameter, and the longest time of non-use in the capped state may be used as a parameter.

Note that a parameter that can be used as the input data X 801 for the learning model 252 is not limited to the above example. Some or all of the parameters stored in the job log information may be used as is as the input data X 801 for the learning model 252. By this, for example, it becomes possible, by machine learning, to use in control an unknown parameter as a factor for necessitating a recovery operation.

Also, as the supervised data T 802, the maintenance job log information 704 that is stored in the training request 700 is used. In other words, by the loss function 804, the shift amount L 805 between the output data Y 803 of when the input data X 801 extracted from the job history information 705 was inputted into the learning model 252, and the maintenance job log information 704 which is the supervised data T 802 is obtained. Then, learning is performed so that the shift amount L 805 becomes a minimum, and the learning model 252 is updated.

Figure 14:
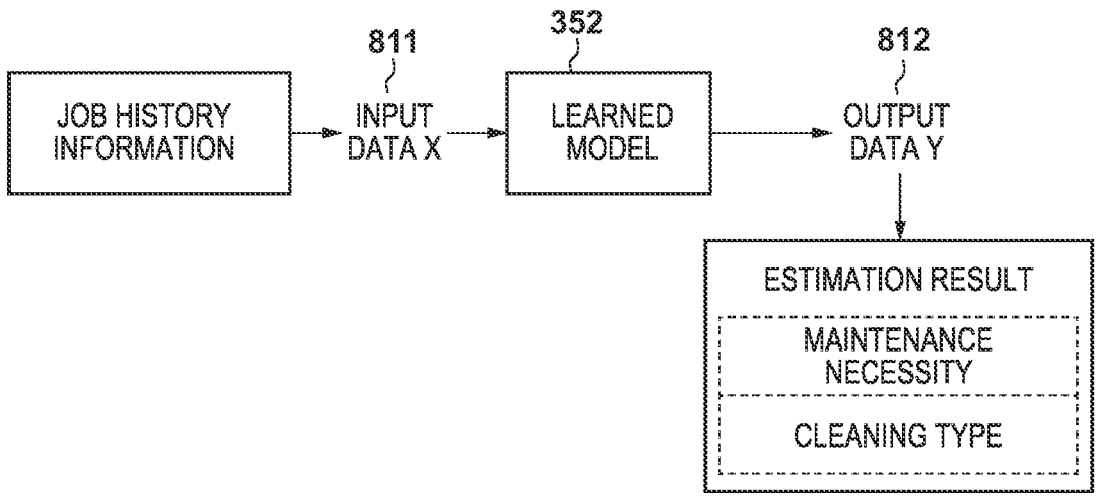
FIG. 14 is a view for describing inputs/outputs of data during estimation in the invention of the present application.

FIG. 14 is a view for illustrating a structure of inputs/outputs of the learned model 352 during estimation. During an estimation, based on the printer identifier 711 passed in the estimation request 710, necessary job history information is extracted from the job log information stored in the edge server 300 and then is used. From the extracted job history information, similarly to during learning, a necessary parameter is calculated and is set as the input data X 811 of the neural network. The output data Y 812 acquired as a result of an estimation by the learned model 352 is returned to the printer 400 in the estimation result response 720. The printer 400 executes a necessary maintenance based on the content of the estimation result response 720.

[Overall Operation]
(Learning Processing)

Figure 15:
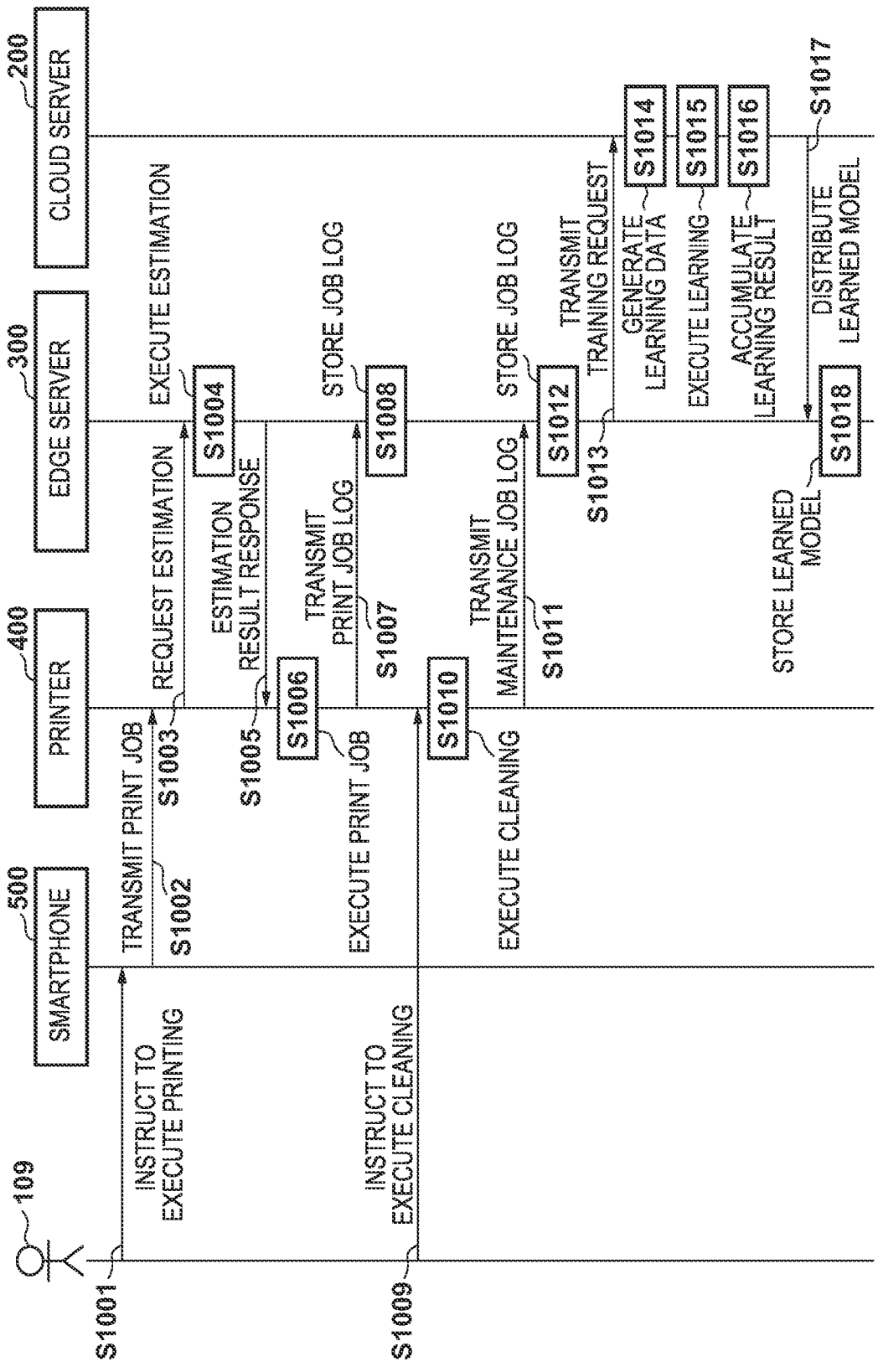
FIG. 15 is a sequence diagram for illustrating behavior of the entire processing system during learning according to the first embodiment.

FIG. 15 is a sequence diagram illustrating an overall movement during learning of the processing system 100 according to the present embodiment. Here, a sequence in a case where learning is performed regarding the necessity of maintenance when a user 109 sees an execution result of a print job and then instructs to execute maintenance is illustrated. Each process in the present processing sequence is realized by the CPU, which is an agent of each process, reading and executing a program stored in the ROM and the like. Note that the processing sequence indicated below, for example, may be executed continuously until an operation of each apparatus is stopped.

In step S1001, the user 109 operates the smartphone 500 and instructs to execute printing that relates to the printer 400. The instruction here may be performed in relation to predetermined data via an application (not illustrated) comprised by the smartphone 500.

In step S1002, the smartphone 500 transmits the print job to the printer 400 based on the received user instruction. The print job here is transmitted in the data configuration as described in FIGS. 9A to 9C.

In step S1003, the printer 400 transmits the estimation request 710 to the edge server 300 when it receives the print job from the smartphone 500.

In step S1004, the edge server 300 performs an estimation by the learned model 352 when it receives the estimation request 710 from the printer 400. Because the sequence during learning is described here, it is described assuming that in the estimation processing at this time, an estimation that there is no necessity for maintenance was performed.

In step S1005, the edge server 300 transmits to the printer 400 the estimation result response 720 based on the estimation result from step S1004.

In step S1006, the printer 400 performs an execution of the print job received from the smartphone 500 when it receives the estimation result response 720 from the edge server 300.

In step S1007, the printer 400, after the print operation of the print job has ended, transmits to the edge server 300 the print job log information 940 indicating the print result thereof.

In step S1008, the edge server 300 stores the print job log information 940 received from the printer 400 as job log information that relates to the printer in a log information recording region arranged in the hard disk unit 202 within the edge server 300.

Next, a case where the user 109 sees the print result of the print job executed in step S1006 and then determines that cleaning of the printhead 603 is necessary is described. Here, as a case where cleaning is necessary, for example, a case where faintness or irregularity of an image has occurred in a print product and the quality has become lower and the like may be given.

In step S1009, the user 109 instructs to execute cleaning from the operation panel 422 of the printer 400. Note that an instruction to execute cleaning may be performed via the smartphone 500.

In step S1010, the printer 400 executes the designated cleaning based on the received user instruction.

In step S1011, the printer 400, after the execution of the cleaning in step S1010 has ended, transmits to the edge server 300 the maintenance job log information 980 indicating the cleaning result thereof.

In step S1012, the edge server 300 stores the maintenance job log information 980 received from the printer 400 in a log information recording region arranged in the hard disk unit 202 within the edge server 300.

In step S1013, the edge server 300 transmits the training request 700 in relation to the cloud server 200 when it receives the maintenance job log information 980 from the printer 400. As described above, information related to the received maintenance job log information 980 is included in the training request 700.

In step S1014, the cloud server 200 generates learning data by the learning data generation unit 250 based on the training request 700 received from the edge server 300. The method described above is used as the method of generating the learning data.

In step S1015, the cloud server 200 executes learning by the learning unit 251 using the learning data generated in step S1014. The CPU 211 and the GPU 217 comprised by the cloud server 200 is used in the learning processing.

In step S1016, the cloud server 200 updates/accumulates the learning model 252 based on the learning result of the learning processing in step S1015.

In step S1017, the cloud server 200 generates the learned model 352 to be distributed to the edge server 300 from the learning model 252 acquired from the learning processing and then distributes the learned model 352 to the edge server 300.

In step S1018, the edge server 300, when it receives the learned model 352 distributed from the cloud server 200, applies the learned model 352 to its own learned model 352 and stores what it applied. By this, the updated learned model 352 is used in relation to subsequent estimation requests. Then, the present processing sequence is ended.

Note that although it was described here that each type of job log information transmitted from the printer 400 was to be stored in a log information storage region arranged in the hard disk unit 202 within the edge server 300, no limitation is made to this. A configuration may be taken so as to store the job log information in the cloud server 200 or save in another server different from the edge server 300 or the cloud server 200.

Also, although it was described that a distribution of a learned model is performed to the edge server 300 every time learning is performed on the cloud server 200, no limitation is made to this configuration. In a case where a large amount of learning is performed on the cloud server 200, a distribution may not be performed every time. Accordingly, the learned model may be distributed on a regular basis or may be distributed based on a distribution request (not illustrated) transmitted from the edge server 300.

(Estimation Processing)

Figure 16:
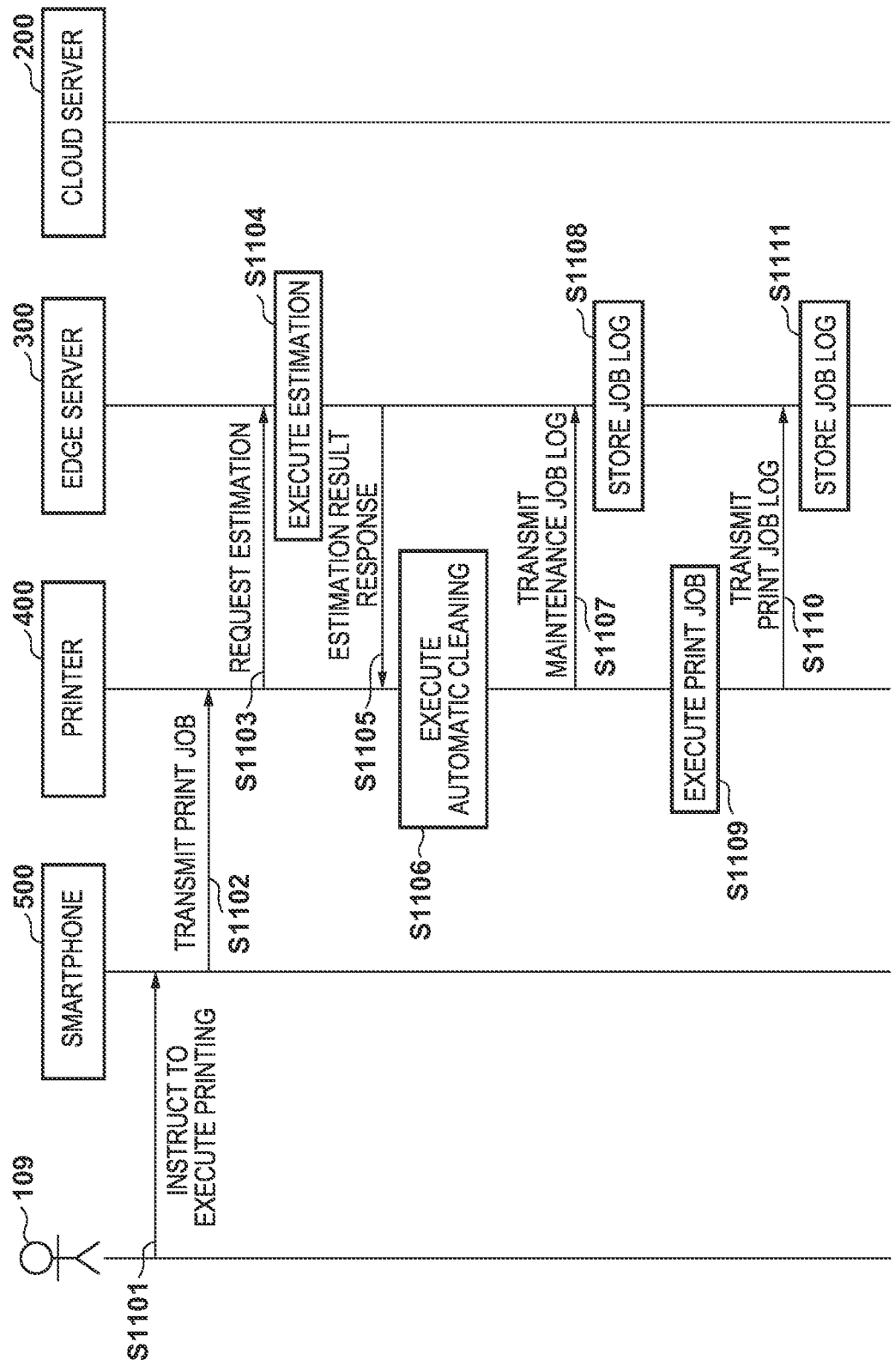
FIG. 16 is a sequence diagram for illustrating behavior of the entire processing system during estimation according to the first embodiment.

FIG. 16 is a sequence diagram illustrating an overall movement during estimation of the processing system 100 according to the present embodiment. Here, a sequence in a case where the printer 400 automatically executes a maintenance when it is determined that a maintenance is necessary as a result of an estimation is illustrated. Each process in the present processing sequence is realized by the CPU, which is an agent of each process, reading and executing a program stored in the ROM and the like. Note that the processing sequence indicated below, for example, may be executed continuously until an operation of each apparatus is stopped.

In step S1101, the user 109 operates the smartphone 500 and instructs to execute printing that relates to the printer 400. The instruction here may be performed in relation to predetermined data via an application (not illustrated) comprised by the smartphone 500.

In step S1102, the smartphone 500 transmits the print job to the printer 400 based on the received user instruction. The print job here is transmitted in the data configuration as described in FIG. 9A to FIG. 9C.

In step S1103, the printer 400 transmits the estimation request 710 to the edge server 300 when it receives the print job from the smartphone 500.

In step S1104, the edge server 300 performs an estimation by using the learned model 352 when it receives the estimation request 710 from the printer 400. In the estimation processing at this time, it is described assuming that an estimation that there is necessity for maintenance was performed.

In step S1105, the edge server 300 transmits to the printer 400 the estimation result response 720 based on the estimation result from step S1104.

In step S1106, the printer 400 executes cleaning based on the content of the estimation result response 720. Here, the estimation result 723 of the estimation result response 720 is "present". Also, the cleaning type to execute is based on the type stored in the cleaning type 724 of the estimation result response 720.

In step S1107, the printer 400, after the execution of the automatic cleaning in step S1106 has ended, transmits to the edge server 300 the maintenance job log information 980 indicating the cleaning result thereof.

In step S1108, the edge server 300 stores the maintenance job log information 980 received from the printer 400 in a log information recording region arranged in the hard disk unit 202 within the edge server 300.

In step S1109, the printer 400 performs an execution of the print job received from the smartphone 500 after transmitting the maintenance job log information 980 from step S1107.

In step S1110, the printer 400, after the print operation of the print job of step S1109 has ended, transmits to the edge server 300 the print job log information 940 indicating the print result thereof.

In step S1111, the edge server 300 stores the print job log information 940 received from the printer 400 in a log information recording region arranged in the hard disk unit 202 within the edge server 300. Then, the present processing sequence is ended.

(Processing in Printer)

Figure 17:
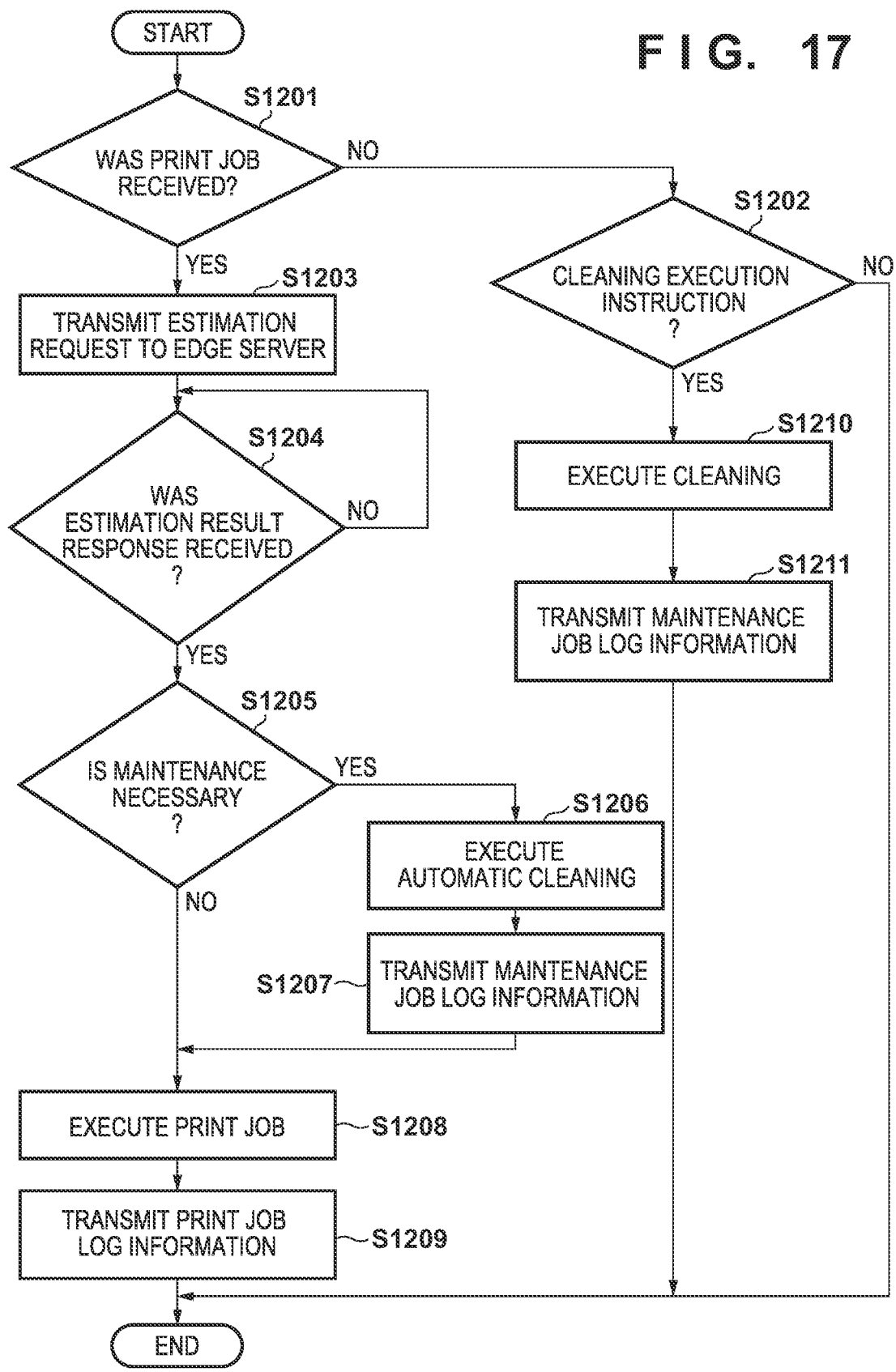
FIG. 17 is a flowchart for illustrating processing of the printer according to the first embodiment.

FIG. 17 is a flowchart illustrating the processing content of the printer 400. The present processing flow is executed every time some kind of a job or an instruction is received in relation to the printer 400 from an external unit after an initialization operation is executed in accordance with the printer 400 being powered on. The present processing flow is realized by the CPU 411 of the printer 400 executing a program stored in the program memory 412 of the printer 400. The present processing flow corresponds to processing by the printer 400 among sequences illustrated in FIGS. 15 and 16. Note that processing aside from the processing related to the present embodiment is omitted here.

In step S1201, the printer 400 determines whether or not the print job 900 was received. In a case where the print job was received (YES in step S1201), the processing proceeds to step S1203 and in a case where it was not received (NO in step S1201), the processing proceeds to step S1202.

In step S1202, the printer 400 determines whether or not the cleaning execution instruction was received. In a case where the cleaning execution instruction was received (YES in step S1202), the processing proceeds to step S1210 and in a case where it was not received (NO in step S1202), the present processing flow is ended.

In step S1203, the printer 400 transmits the estimation request 710 in relation to the edge server 300 in order to determine whether or not maintenance is necessary when executing the received print job 900. In the estimation request 710 to be sent, the print job log information 940 related to the print job 900 to be executed is stored in the job log information 714 and is transmitted in relation to the edge server 300 by the data transceiver unit 451.

In step S1204, the printer 400 determines whether or not the estimation result response 720 was received from the edge server 300 as a response that relates to the estimation request 710 transmitted in step S1203. In a case where the estimation result response 720 was received (YES in step S1204), the processing proceeds to step S1205 and in a case where it is not received (NO in step S1204), the printer 400 waits until the estimation result response 720 is received.

Note that in a case where the estimation result response 720 cannot be received even when a predetermined time has elapsed from when the estimation request 710 was transmitted, a configuration may be such that a print job is executed without performing a cleaning operation. Alternatively, the user may be asked whether or not to perform a cleaning operation.

In step S1204, the printer 400 determines whether or not there is necessity to perform a maintenance operation based on the content of the received estimation result response 720. In a case where there is no necessity for maintenance (NO in step S1204), the processing proceeds to step S1208, and in a case where there is necessity for maintenance (YES in step S1204), the processing proceeds to step S1206.

In step S1206, the printer 400 executes an automatic cleaning operation in accordance with the content of the cleaning type 724 stored in the estimation result response 720.

In step S1207, the printer 400, generates the maintenance job log information 980 related to the automatic cleaning operation executed in step S1206, and transmits it to the edge server 300. Then, the processing proceeds to step S1208.

In step S1208, the printer 400 executes a print operation that relates to the received print job 900.

In step S1209, the printer 400 generates and then transmits to the edge server 300 the print job log information 940 related to the print job 900 executed in step S1208. Then, the present processing flow is ended.

In step S1210, the printer 400 executes the cleaning operation based on the received cleaning execution designation.

In step S1211, the printer 400, generates the maintenance job log information 980 related to the cleaning operation executed in step S1210, and transmits it to the edge server 300. Then, the present processing flow is ended.

Note that although the processing of a print job is given and described in the above flowchart as an example, a configuration may be taken so as to perform the same control for copying and other operations.

(Processing on Edge Server)

Figure 18:
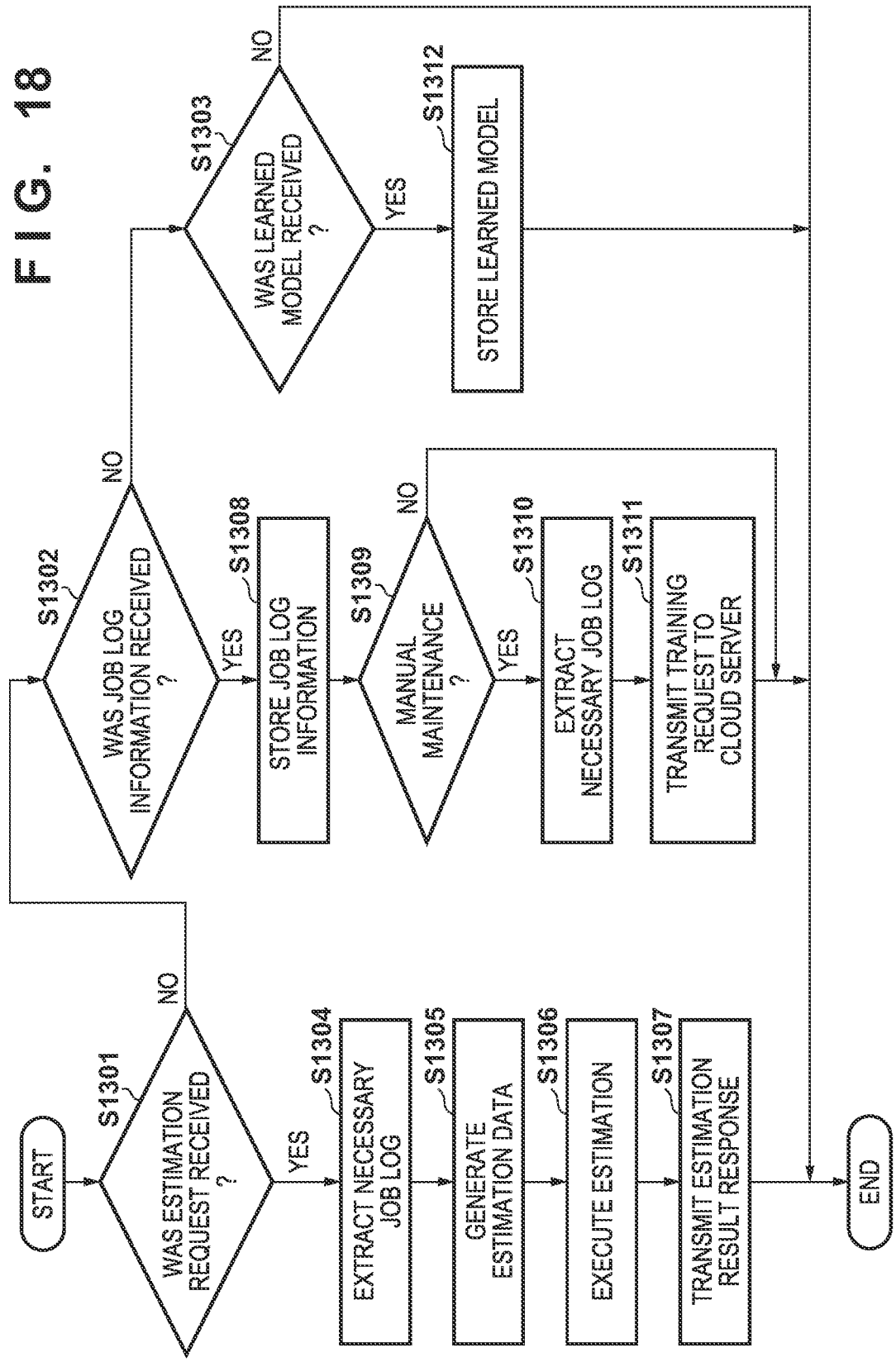
FIG. 18 is a flowchart for illustrating processing of an edge server according to the first embodiment.

FIG. 18 is a flowchart illustrating the processing content of the edge server 300. The present processing flow is executed every time some kind of a job or an instruction is received in relation to the edge server 300 from an external unit after an initialization operation is executed in accordance with the edge server 300 being powered on. The present processing flow is realized by the CPU 211 of the edge server 300 executing a program stored in the program memory 213 of the edge server 300. The present processing flow corresponds to processing by the edge server 300 among sequences illustrated in FIG. 15 and FIG. 16. Note that processing aside from the processing related to the present embodiment is omitted here.

In step S1301, the edge server 300 determines whether or not it received the estimation request 710 from the printer 400. In a case where the estimation request 710 was received (YES in step S1301), the processing proceeds to step S1304 and in a case where it was not received (NO in step S1301), the processing proceeds to step S1302.

In step S1302, the edge server 300 determines whether or not some kind of job log information was received from the printer 400. In a case where the job log information was received (YES in step S1302), the processing proceeds to step S1308 and in a case where it was not received (NO in step S1302), the processing proceeds to step S1303.

In step S1303, the edge server 300 determines whether or not a learned model was received from the cloud server 200. In a case where the learned model was received (YES in step S1303), the processing proceeds to step S1312 and in a case where it was not received (NO in step S1303), the present processing flow is ended.

In step S1304, the edge server 300 extracts from the log information storage region of the hard disk unit 202 the job log information necessary for performing the requested estimation processing based on the received estimation request 710. Specifically, the job log information that coincides with the printer identifier 711 stored in the estimation request 710 is extracted and then from that, job log information that was produced after the last maintenance was executed is extracted. Also, a configuration may be taken so as to only extract the job log information within a fixed period in a case where it is difficult to extract and process all of the job log information. The processing proceeds to step S1305 after the necessary job log information is extracted.

In step S1305, the edge server 300 generates the input data X 811 that relates to the learned model 352 from the job log information extracted in step S1304. Specifically, the estimation data generation unit 353 calculates the estimation data to be used in estimation processing from the job log information and then sets as the input data X 811.

In step S1306, the edge server 300 executes estimation processing using the estimation data generated in step S1305. Specifically, the estimation unit 351 executes the estimation processing by inputting to the learned model 352 the generated estimation data. As a result of the estimation processing, the output data Y 812 is acquired.

In step S1307, the edge server 300 generates from the estimation result of the estimation processing in step S1306 and then transmits to the printer 400 of a request source the estimation result response 720. Then, the present processing flow is ended.

In step S1308, the edge server 300 stores the received job log information as job log information that relates to the printer in a log information recording region arranged in the hard disk unit 202 within the edge server 300.

In step S1309, the edge server 300 determines whether or not the received job log information was related to a maintenance execution by manual operation. Specifically, in a case where the job type of the received job log information is "maintenance" and the maintenance type 986 stored in the maintenance job log information 980 is "manual", it is possible to determine that the maintenance execution was by manual operation. In a case where the received job log information is related to a maintenance execution by manual operation (YES in step S1309), the processing proceeds to step S1310, and otherwise (NO in step S1309), the present processing flow is ended. Note that because a case where the received job log information relates to a maintenance execution by manual operation is a case where the user determined that a maintenance of the printhead 603 is necessary, it is necessary to perform learning that this is an event in which a maintenance is necessary.

In step S1310, the edge server 300 extracts from the log information storage region of the hard disk unit 202 the job log information necessary for the training request 700. Specifically, the job log information that coincides with the printer identifier 985 stored in the maintenance job log information 980 is extracted and then from that, job log information that was produced after the last maintenance was executed is extracted. The extracted job log information is stored in a region of the job history information 705 of the training request 700 after the log identifier is tabulated. Then, the processing proceeds to step S1311.

In step S1311, the edge server 300 transmits to the cloud server 200 the training request 700 generated in step S1310. Then, the present processing flow is ended.

In step S1312, the edge server 300 applies the received learned model information to the learned model 352 of the edge server 300 and then stores what was applied. By this, the updated learned model 352 will be used in relation to subsequent estimation requests. Then, the present processing flow is ended.

(Processing on Cloud Server)

Figure 19:
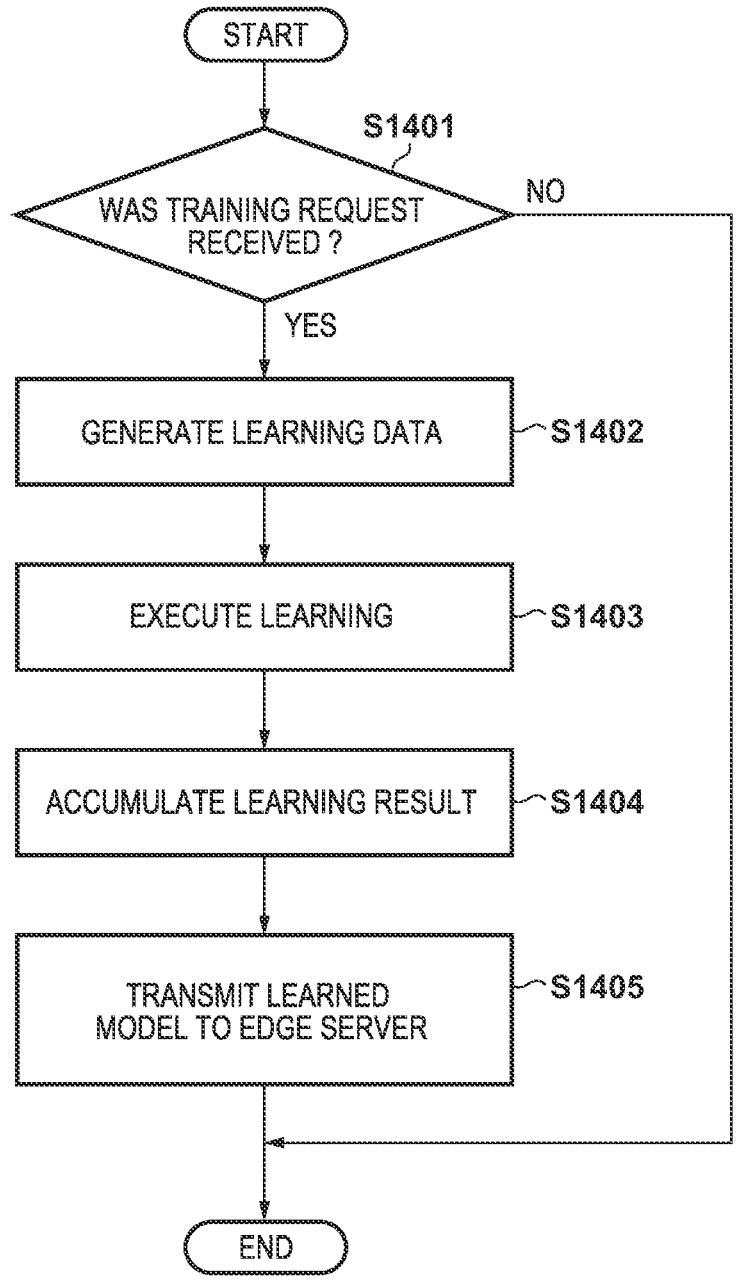
FIG. 19 is a flowchart for illustrating processing of a cloud server according to the first embodiment.

FIG. 19 is a flowchart illustrating the processing content of the cloud server 200. The present processing flow is executed every time some kind of a request is received in relation to the cloud server 200 from an external unit after an initialization operation is executed in accordance with the cloud server 200 being powered on. The present processing flow is realized by the CPU 211 of the cloud server 200 executing a program stored in the program memory 213 of the cloud server 200. The present processing flow corresponds to processing by the cloud server 200 among sequences illustrated in FIG. 15 and FIG. 16. Note that processing aside from the processing related to the present embodiment is omitted here.

In step S1401, the cloud server 200 determines whether or not the training request 700 was received from an external unit. In a case where the training request 700 was received (YES in step S1401), the processing proceeds to step S1402 and in a case where it was not received (NO in step S1401), the present processing flow is ended.

In step S1402, the cloud server 200 generates learning data by the learning data generation unit 250 based on the received training request 700. Specifically, the learning data generation unit 250 generates the input data X 801 that relates to the learning model 252 from the job history information 705 of the received training request 700. Also, the learning data generation unit 250 generates the supervised data T 802 from the maintenance job log information 704 of the training request 700.

In step S1403, the cloud server 200 executes the learning process using the learning data generated in step S1402. Specifically, the learning unit 251 executes learning that relates to the learning model 252 using the learning data generated in step S1402.

In step S1404, the cloud server 200 applies/accumulates information to/in the learning model 252 as the result of the learning processing in step S1403.

In step S1405, the cloud server 200 generates the learned model 352 to be distributed to the edge server 300 from the learning model 252 based on the result of learning, and then transmits the learned model 352 to the edge server 300. Then, the present processing flow is ended.

Note that although it was described here so as to execute learning every time the cloud server 200 receives a training request, the system is not limited to this configuration. Because processing time is necessary to execute learning, a configuration may be taken so as to accumulate the received training requests and then execute learning asynchronously to a reception of a training request. Also although it was described that distribution of the learned model to the edge server 300 is performed every time learning is performed, configuration may be taken so that in a case where a large amount of learning is performed on the cloud server 200, a distribution is not performed every time. Accordingly, the learned model may be distributed on a regular basis or may be distributed based on a distribution request (not illustrated) transmitted from the edge server 300.

Thus, by the present embodiment, it becomes possible to control so as to perform a maintenance operation automatically before executing a print job based on a result of an estimation of the possibility that a maintenance operation of the printhead 603 will be necessary. Also, by, when the user instructs an execution of a maintenance, learned that, and applying what was learned to a learning model, it becomes possible to perform a prediction of the necessity of a maintenance operation more accurately. By virtue of the present invention, it becomes possible to perform a maintenance operation in a device at an optimal timing.

Second Embodiment

In the first embodiment, a mode in which the edge server 300 uses for an estimation the learned model 352 based on the learning model 252 acquired from the learning processing by the cloud server 200 was described. In a case of this mode, a configuration in which the edge server 300 and the printer 400 are arranged in each of a plurality of LANs is considered. Here, the learned model 352 based on the same learning model 252 learned on the cloud server 200 is applied to the edge server 300 of each of the plurality of LANs and then is used. However, there is variability in manufacturing of a printhead, and also, variability in characteristics occurs in accordance with the environment such as the surrounding temperature and humidity of the position at which the printer is installed and the like. Accordingly, there are cases where a timing when a maintenance operation becomes necessary is different for each of individual printer 400. Also, because the intended use of a print product is different depending on the user, there are cases where a determination criterion as to what degree to accept the presence of faintness and irregularity on a print product is different.

In a second embodiment of the invention of the present application, a case where a different maintenance necessity is estimated for each printer 400 and then reflected in recovery operation control is described. Specifically, a general-purpose learning model 253 learned on the cloud server 200 is applied to an individual learning model 356 of the edge server 300, and unique learning is also performed on the edge server 300. The edge server 300 performs learning for only the training requests transmitted to itself and then applies what is learned only to its own individual learning model 356. By this, it becomes possible to perform learning that depends on a characteristic unique to a device group in a range managed by the edge server 300, individual characteristics of the users, printers that are used, and the like.

[Software Configuration]

Figure 20:
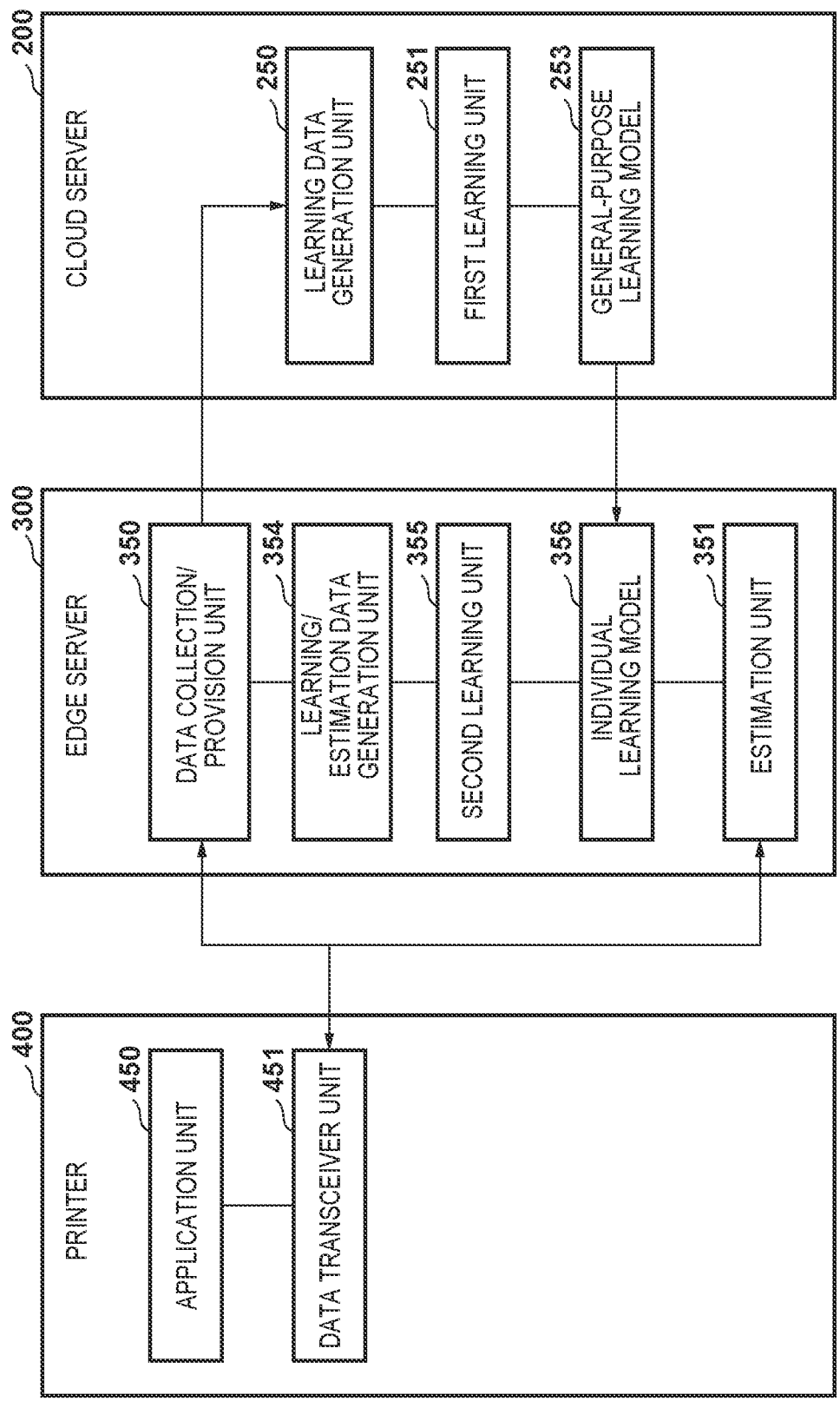
FIG. 20 is a view for illustrating an example of a software configuration of the processing system according to a second embodiment.

FIG. 20 is a view illustrating an example of a software configuration of the processing system 100 according to the present embodiment. Here, among those in the software configuration, only those related to the learning and estimation processing according to the present embodiment are described, and other software modules are not illustrated. For example, an operating system that operates on each device or a server, each type of middleware, an application for maintenance, and the like are omitted from being illustrated. The software configuration of the printer 400 is the same as the configuration illustrated in FIG. 7 of the first embodiment.

The cloud server 200 comprises the learning data generation unit 250, the learning unit 251, and the general-purpose learning model 253. The learning unit 251 is a program module for executing learning related to the general-purpose learning model 253 using learning data received from the learning data generation unit 250. The general-purpose learning model 253 accumulates the result of learning performed in the learning unit 251. Here, an example in which the general-purpose learning model 253, similarly to the learning model 252 described in the first embodiment, is realized as a neural network is described. The general-purpose learning model 253 is distributed as a general-purpose learned model to the edge server 300 and then is used for updating the individual learning model 356 on the edge server 300.

The edge server 300 comprises the data collection/provision unit 350, a learning/estimation data generation unit 354, a learning unit 355, the individual learning model 356, and the estimation unit 351. The data collection/provision unit 350 is a module for transmitting as a data group to use for learning on the cloud server 200 data received from the printer 400 and data that the edge server 300 collected by itself. Also, these sets of data are transmitted to the learning/estimation data generation unit 354 as a data group that the edge server 300 uses for its learning. The learning/estimation data generation unit 354 is a module for generating learning data that can be processed by the learning unit 355 from data that is received from an external unit. The learning unit 355 is a program module for executing learning related to the individual learning model 356 using learning data received from the learning/estimation data generation unit 354.

The individual learning model 356 accumulates the result of learning performed in the learning unit 355. Also, the learning unit 355 applies a difference to the neural network of the individual learning model 356 when it receives a general-purpose learned model distributed from the cloud server 200. Although no limitation is made in particular to the determination method here, for example, a reflection may be performed in relation to a weighting coefficient. By this, it becomes possible to execute an estimation using a learned model in which both a result of general-purpose learning performed by the cloud server 200 and a result of individual learning performed by the edge server 300 itself are applied.

The estimation unit 351 is a program module that executes an estimation using the individual learning model 356 based on data transmitted from an external apparatus (for example, the printer 400) and then returns the result thereof to the external apparatus. Data sent from an external apparatus is data to be the input data X of the estimation unit 351.

Note that although an example in which learning and an estimation are both performed is described in the following example, configuration may be such that only learning or an estimation are performed in the present embodiment.

[Learning Processing]

Figure 21:
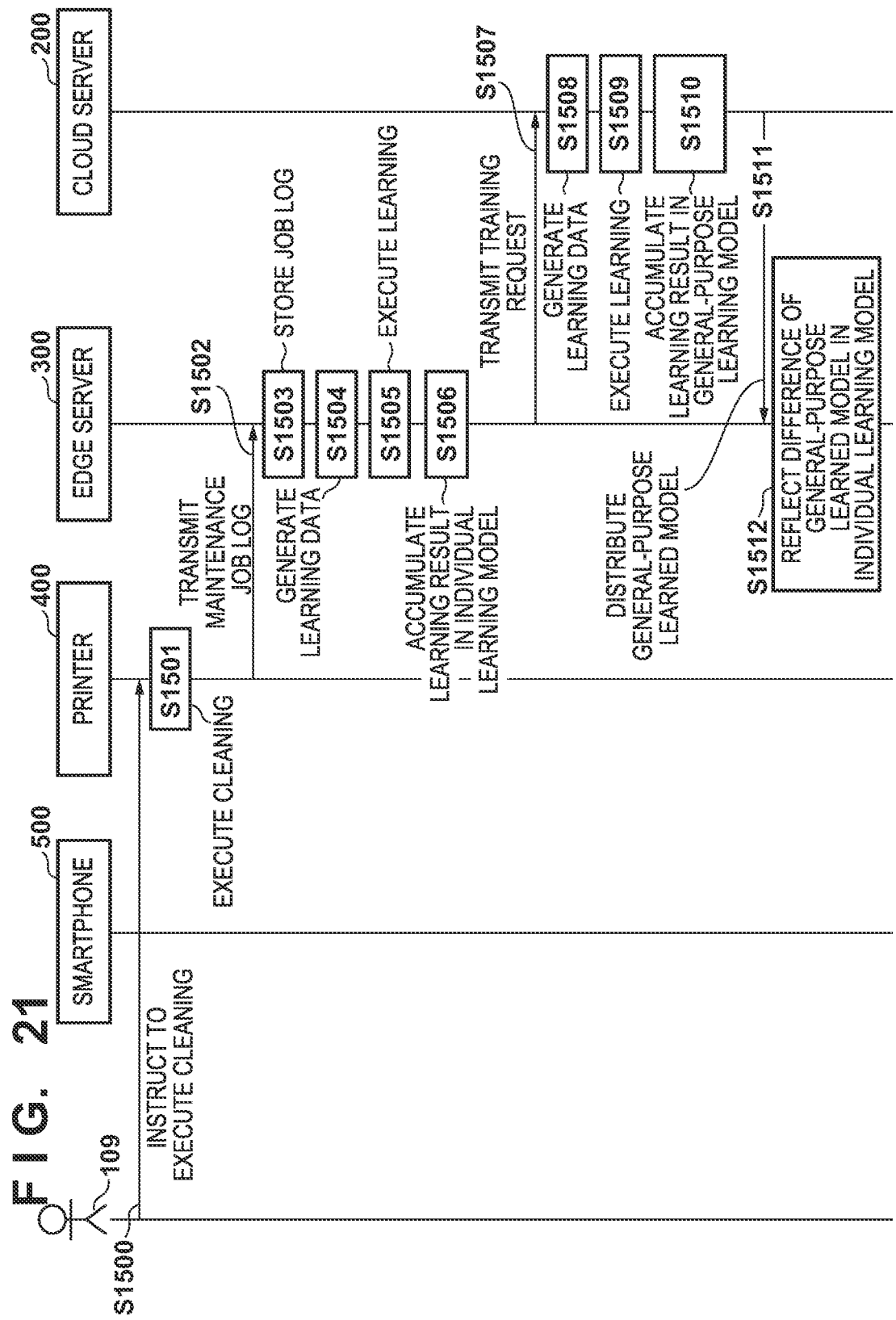
FIG. 21 is a sequence diagram for illustrating behavior of the entire processing system during learning according to the second embodiment.

FIG. 21 is a sequence diagram illustrating an overall movement during learning of the processing system 100 according to the present embodiment. Here, a sequence in a case where learning is performed on each of the edge server 300 and the cloud server 200 regarding the necessity of maintenance when the user 109 sees an execution result of a print job and then instructs to execute maintenance is illustrated. Each process in the present processing sequence is realized by a CPU, which is an agent of each process, reading and executing a program stored in the ROM and the like. Note that the processing sequence indicated below, for example, may be executed continuously until an operation of each apparatus is stopped.

In step S1500, the user 109 instructs to execute cleaning from the operation panel 422 of the printer 400. Note that an instruction to execute cleaning may be performed via the smartphone 500.

In step S1501, the printer 400 executes the designated cleaning based on the received user instruction.

In step S1502, the printer 400, after the execution of the cleaning in step S1501 has ended, transmits to the edge server 300 the maintenance job log information 980 indicating the cleaning result thereof.

In step S1503, the edge server 300 stores the maintenance job log information 980 received from the printer 400 in a log information recording region arranged in the hard disk unit 202 within the edge server 300.

In step S1504, the edge server 300 generates learning data by the learning/estimation data generation unit 354 based on the maintenance job log information 980 received from the printer 400. Here, the learning data may be generated including printer identifier information in order to perform learning that is dependent on an individual printer 400. A method of generating learning data may be the same method as described in the first embodiment.

In step S1505, the edge server 300 executes learning by the learning unit 355 using the learning data generated in step S1504. The CPU 211 and the GPU 217 comprised by the edge server 300 is used in the learning processing.

In step S1506, the edge server 300 updates/accumulates the individual learning model 356 based on the learning result of the learning processing in step S1505.

In step S1507, the edge server 300 transmits the training request 700 in relation to the cloud server 200. The maintenance job log information 980 transmitted from the printer 400 is used in both learning for the individual learning model 356 by the edge server 300 and learning for the general-purpose learning model 253 by the cloud server 200. Thus, here, the training request 700 including the maintenance job log information 980 is also transmitted to the cloud server 200. Note that although it was described in the present embodiment that the training request 700 is transmitted to the cloud server 200 after the learning processing (steps S1504 to S1506) on the edge server 300 is ended, no limitation is made necessarily to an order of processing. The edge server 300 may be configured to perform its learning processing after transmitting the training request 700 to the cloud server 200. Also, a configuration may be taken so as not to transmit from the edge server 300 the training request 700 to the cloud server 200 but to transmit the training request 700 to both the edge server 300 and the cloud server 200 from the printer 400.

In step S1508, the cloud server 200 generates learning data by the learning data generation unit 250 based on the training request 700 received in step S1507. Here, configuration may be such that learning data is generated by excluding printer identifier information from the learning data so as to exclude learning that is dependent on an individual printer 400. A method of generating learning data may be the same method as described in the first embodiment.

In step S1509, the cloud server 200 executes learning by the learning unit 251 using the learning data generated in step S1508. The CPU 211 and the GPU 217 comprised by the cloud server 200 is used in the learning processing.

In step S1510, the cloud server 200 updates/accumulates the general-purpose learning model 253 based on the learning result of the learning processing in step S1509.

In step S1511, the cloud server 200 generates the general-purpose learned model to be distributed to the edge server 300 from the general-purpose learning model 253 acquired from the learning processing of step S1510 and then distributes the general-purpose learned model to the edge server 300.

In step S1512, the edge server 300, when it receives the general-purpose learned model distributed from the cloud server 200, applies the difference to its own individual learning model 356 and stores what it applied. By this, it becomes possible to, in relation to estimation requests thereafter, execute estimation processing using a learned model in which both a result of general-purpose learning performed by the cloud server 200 and a result of individual learning performed by the edge server 300 itself are applied. Then, the present processing sequence is ended.

(Processing on Edge Server)

Figure 22:
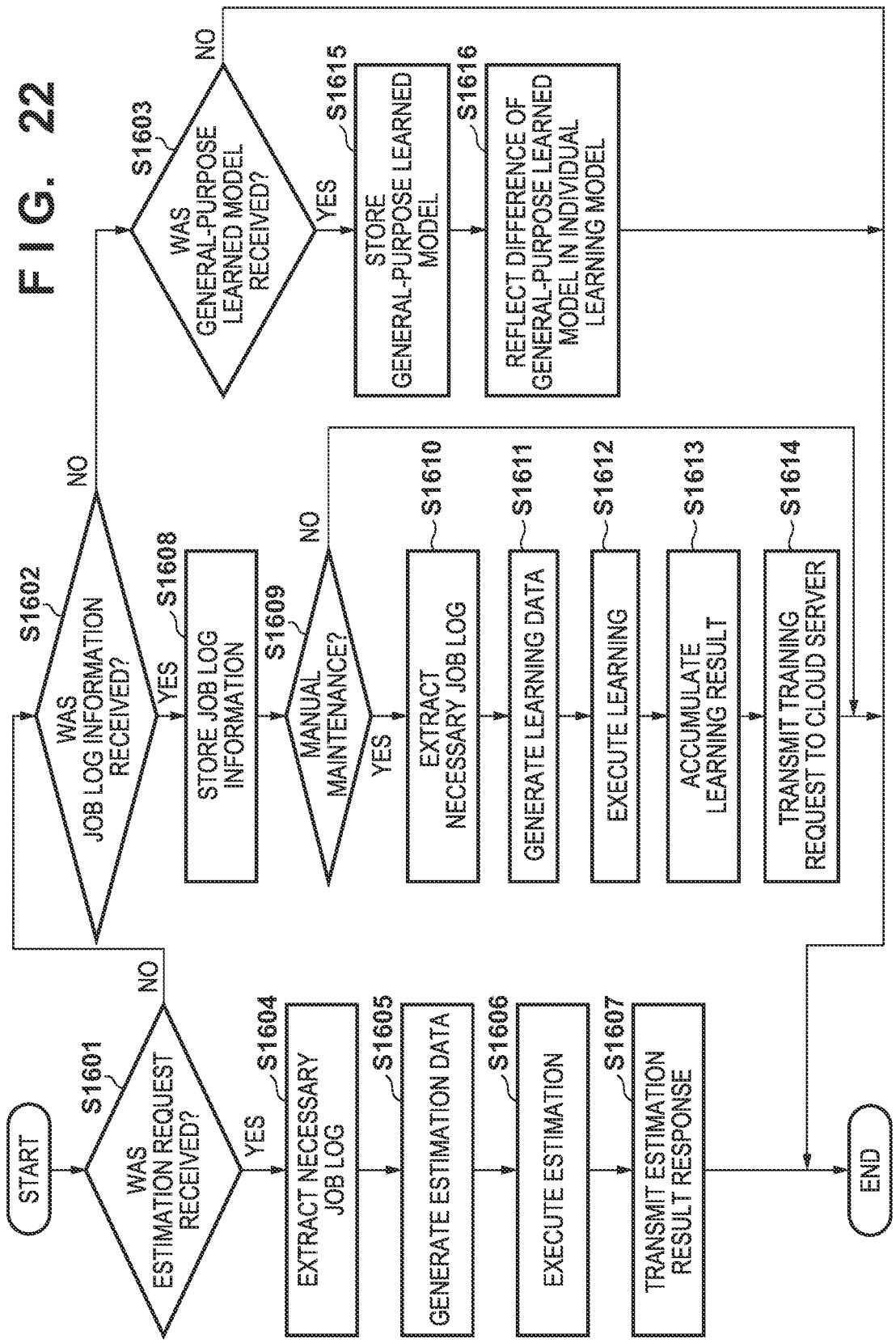
FIG. 22 is a flowchart for illustrating processing of an edge server according to the second embodiment.

FIG. 22 is a flowchart illustrating the processing content of the edge server 300. The present processing flow is executed every time some kind of a job or an instruction is received in relation to the edge server 300 from an external unit after an initialization operation is executed in accordance with the edge server 300 being powered on. The present processing flow is realized by the CPU 211 of the edge server 300 executing a program stored in the program memory 213 of the edge server 300. The present processing flow corresponds to processing by the edge server 300 among sequences illustrated in FIG. 21 or FIG. 16. Note that processing aside from the processing related to the present embodiment is omitted here.

In step S1601, the edge server 300 determines whether or not it received the estimation request 710 from the printer 400. In a case where the estimation request was received (YES in step S1601), the processing proceeds to step S1604 and in a case where it was not received (NO in step S1601), the processing proceeds to step S1602.

In step S1602, the edge server 300 determines whether or not some kind of job log information was received from the printer 400. In a case where the job log information was received (YES in step S1602), the processing proceeds to step S1608 and in a case where it was not received (NO in step S1602), the processing proceeds to step S1603.

In step S1603, the edge server 300 determines whether or not a general-purpose learned model was received from the cloud server 200. In a case where the general-purpose learned model was received (YES in step S1603), the processing proceeds to step S1615 and in a case where it was not received (NO in step S1603), the present processing flow is ended.

In step S1604, the edge server 300 extracts from the log information storage region of the hard disk unit 202 the job log information necessary for performing the requested estimation processing based on the received estimation request 710. Specifically, the job log information that coincides with the printer identifier 711 stored in the estimation request 710 is extracted and then from that, job log information that was produced after the last maintenance was executed is extracted. Also, a configuration may be taken so as to only extract the job log information within a fixed period in a case where it is difficult to extract and process all of the job log information. The processing proceeds to step S1605 after the necessary job log information is extracted.

In step S1605, the edge server 300 generates the input data X 811 that relates to the individual learning model 356 from the job log information extracted in step S1604. Specifically, the learning/estimation data generation unit 354 calculates the estimation data to be used in estimation processing from the job log information and then sets as the input data X 811.

In step S1606, the edge server 300 executes estimation processing using the estimation data generated in step S1605. Specifically, the estimation unit 351 executes the estimation processing by inputting to the individual learning model 356 the generated estimation data. As a result of the estimation processing, the output data Y 812 is acquired.

In step S1607, the edge server 300 generates from the estimation result of the estimation processing in step S1606 and then transmits to the printer 400 of a request source the estimation result response 720. Then, the present processing flow is ended.

In step S1608, the edge server 300 stores the received job log information as job log information that relates to the printer in a log information recording region arranged in the hard disk unit 202 within the edge server 300.

In step S1609, the edge server 300 determines whether or not the received job log information was related to a maintenance execution by manual operation. Specifically, in a case where the job type of the received job log information is "maintenance" and the maintenance type 986 stored in the maintenance job log information 980 is "manual", it is possible to determine that the maintenance execution was by manual operation. In a case where the received job log information is related to a maintenance execution by manual operation (YES in step S1609), the processing proceeds to step S1610, and otherwise (NO in step S1609), the present processing flow is ended. Note that because a case where the received job log information relates to a maintenance execution by manual operation is a case where the user determined that a maintenance of the printhead 603 is necessary, it is necessary to perform learning that this is an event in which a maintenance is necessary.

In step S1610, the edge server 300 extracts from the log information storage region of the hard disk unit 202 the job log information necessary for performing learning by the learning unit 355. The present processing may perform processing of the same content as described in the process in step S1604.

In step S1611, the edge server 300 generates learning data by the learning/estimation data generation unit 354. Specifically, the learning/estimation data generation unit 354 generates the input data X 801 in relation to the individual learning model 356 using the job log information extracted in step S1610. Also, the learning/estimation data generation unit 354 generates the supervised data T 802 from the received maintenance job log information 704.

In step S1612, the edge server 300 executes learning based on the learning data generated in step S1611. Specifically, the learning unit 355 executes learning processing related to the individual learning model 356 by using the learning data generated in step S1611.

In step S1613, the edge server 300 applies the learning processing in step S1612 to the individual learning model 356 and then accumulates what was applied.

In step S1614, the edge server 300 transmits to the cloud server 200 the training request 700. Note that the maintenance job log information 980 transmitted from the printer 400 is used in both learning for the individual learning model 356 by the edge server 300 and learning for the general-purpose learning model 253 by the cloud server 200. Thus, the edge server 300 generates the training request 700 from the maintenance job log information 980 and the extracted job log information and then transmits the generated training request 700 to the cloud server 200. Then, the present processing flow is ended.

In step S1615, the edge server 300 applies differences between the received general-purpose learned model information and the individual learning model 356 of the edge server 300 to the individual learning model 356 of the edge server 300 and then stores what was applied. By this, the updated individual learning model 356 will be used in relation to subsequent estimation requests. Then, the present processing flow is ended.

(Processing on Cloud Server)

Figure 23:
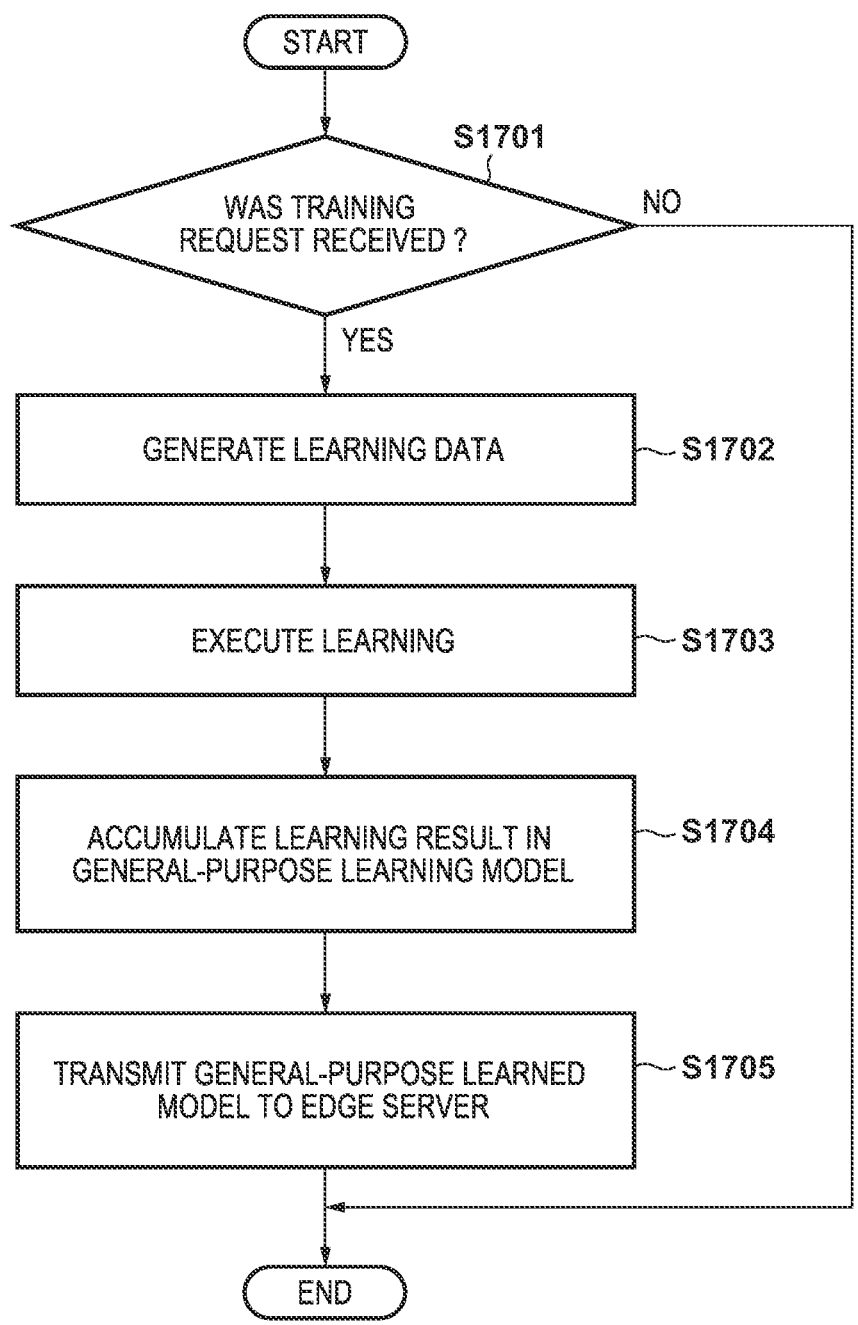
FIG. 23 is a flowchart for illustrating processing of a cloud server according to the second embodiment.

FIG. 23 is a flowchart illustrating the processing content of the cloud server 200. The present processing flow is executed every time some kind of a request is received in relation to the cloud server 200 from an external unit after an initialization operation is executed in accordance with the cloud server 200 being powered on. The present processing flow is realized by the CPU 211 of the cloud server 200 executing a program stored in the program memory 213 of the cloud server 200. The present processing flow corresponds to processing by the cloud server 200 among sequences illustrated in FIG. 21 and FIG. 16. Note that processing aside from the processing related to the present embodiment is omitted here.

In step S1701, the cloud server 200 determines whether or not the training request 700 was received from an external unit. In a case where the training request 700 was received (YES in step S1701), the processing proceeds to step S1702 and in a case where it was not received (NO in step S1701), the present processing flow is ended.

In step S1702, the cloud server 200 generates learning data by the learning data generation unit 250 based on the received training request 700. Specifically, the learning data generation unit 250 generates the input data X 801 that relates to the learning model 252 from the job history information 705 stored in the received training request 700. Here, configuration may be such that the input data X 801 is generated by excluding printer identifier information so as to exclude learning that is dependent on an individual printer 400. Also, the learning data generation unit 250 generates the supervised data T 802 from the maintenance job log information 704 stored in the training request 700.

In step S1703, the cloud server 200 executes the learning process using the learning data generated in step S1702. Specifically, the learning unit 251 executes learning that relates to the general-purpose learning model 253 using the learning data generated in step S1702.

In step S1704, the cloud server 200 applies/accumulates information to/in the general-purpose learning model 253 as the result of the learning processing in step S1703.

In step S1705, the cloud server 200 generates the general-purpose learned model to be distributed to the edge server 300 from the general-purpose learning model 253 based on the result of learning, and then transmits the general-purpose learned model to the edge server 300. Then, the present processing flow is ended.

Thus, by the present embodiment, it becomes possible to perform learning depending on a unique characteristic that is different for each individual printer 400 or the characteristics of the user. Note that learning depending on a unique characteristic is not limited to the individual printer 400 and learning depending on a group using another grouping information may be performed. As an example of grouping information, information related to a company or an organization to which a device or the user belongs, information related to a country or a region in which the printer 400 is placed and operates, business type information that accords to the content of the work for which the device is used, and the like may be given. In such a case, it is possible to realize by adding as appropriate information for identifying such a group in a data structure of each type of job log information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-219853, filed Dec. 4, 2019 which is hereby incorporated by reference herein in its entirety.

What is claimed is:

1. A system comprising:
at least one memory; and
at least one processor, wherein
the at least one processor is configured to, when executing a program stored in the at least one memory, cause the system to function as the following units:
an acquisition unit configured to acquire log information of a job executed on a device and information of a type of maintenance instructed by a user after execution of the job; and
a learning unit configured to perform learning for generating, by using the log information of the device and the information of the type of maintenance acquired by the acquisition unit as learning data, a learned model to be used by the device to estimate necessity of executing a maintenance operation.

2. The system according to claim 1, wherein
output data that is outputted by the learned model as necessity to execute a maintenance operation includes whether or not there is necessity to execute a maintenance operation and a type of the maintenance operation.

3. The system according to claim 1, wherein
The acquisition unit is further configured to acquire information based on a job to be newly executed on a device; and wherein
the at least one processor is configured to, when executing a program stored in the at least one memory, cause the system to further function as:
an estimation unit configured to estimate, by applying information based on the job to be newly executed by the device acquired by the acquisition unit as input data to the learned model generated by the learning unit, necessity to execute a maintenance operation by the device.

4. The system according to claim 3, wherein
the estimation unit is further configured to estimate a type of maintenance using the learned model when the maintenance operation is estimated to be necessary.

5. The system according to claim 1, wherein
the device is a printer that includes a printhead for performing printing by discharging ink in relation to a printing medium, and
the maintenance operation is a recovery operation in relation to the printhead.

6. The system according to claim 5, wherein
the learning unit performs learning by setting, among log information of jobs executed by the printer, information based on log information of jobs related to a print operation executed based on an instruction of a user as supervised data to be used for a comparison with output data that is outputted from the learning model.

7. The system according to claim 1, wherein
the learning unit includes:
a first learning unit configured to perform learning for generating, using the log information of jobs executed on a plurality of devices as learning data, a first learning model to be used by the plurality of devices to estimate necessity to execute a maintenance operation;
a second learning unit configured to perform learning for generating, using log information of jobs executed on one device of the plurality of devices as learning data, a second learning model to be used by the one device to estimate necessity to execute a maintenance operation; and
a generation unit configured to generate, by applying information of the first learning model to the second learning model, a learned model to be used by the one device to estimate necessity to execute a maintenance operation.

8. The system according to claim 7, wherein
information of the log information used as learning data by the first learning unit and information of the log information used as learning data by the second learning unit are different.

9. The system according to claim 7, wherein
the first learning unit, the second learning unit, and the generation unit are comprised by different apparatuses.

10. The system according to claim 1, wherein
the acquisition unit is configured to acquire the log information including the information of the type of maintenance instructed by a user after execution of the job indicated by the type of maintenance.

11. The system according to claim 1, wherein
maintenance indicated by the type of maintenance includes standard cleaning and powerful cleaning.

12. A system comprising:
at least one memory; and
at least one processor, wherein
   the at least one processor is configured to, when executing a program stored in the at least one memory, cause the system to function as the following units:
      an acquisition unit configured to acquire information based on a job to be newly executed by a device; and
      an estimation unit configured to estimate, by applying information based on the job to be newly executed by the device acquired by the acquisition unit as input data to a learned model for estimating necessity to execute a maintenance operation, the necessity to execute the maintenance operation by the device, wherein the learned model is generated by learning based on log information of a job executed on the device and information of a type of maintenance instructed by a user after execution of the job.

13. The system according to claim 12, wherein
the system further includes a control unit for executing a maintenance operation in relation to the device based on an estimation result by the estimation unit.

14. The system according to claim 13, wherein
the estimation result by the estimation unit includes whether or not there is necessity to execute a maintenance operation and a type of the maintenance operation.

15. The system according to claim 12, wherein
the device is a printer that includes a printhead for performing printing by discharging ink in relation to a printing medium, and
the maintenance operation is a recovery operation that relates to the printhead.

16. The system according to claim 15, wherein
the input data includes at least one of identification information of the printer, an elapsed time from when the printer last performed a print operation, a number of times a print operation was performed after the printer last performed a recovery operation, a number of pages printed after the printer last performed a recovery operation, an amount of ink used in a print operation performed after the printer last performed a recovery operation, a density of ink usage in a print operation last performed by the printer, the type of maintenance that was last performed by the printer, non-use time in which the printhead was in a capped state, and non-use time in which the printhead was not in a capped state.

17. A method executed by an information processing apparatus, the method comprising:
   acquiring log information of a job executed on a device and information of a type of maintenance instructed by a user after execution of the job; and
   performing learning for generating, using the acquired log information and the information of the type of maintenance of the device as learning data, a learned model to be used for estimating necessity for the device to execute a maintenance operation.

18. A method executed by an information processing apparatus, the method comprising:
   acquiring information based on a job to be newly executed by a device; and
   estimating, by applying the acquired information based on the job to be newly executed by the device as input data to a learned model for estimating necessity to execute a maintenance operation, the necessity for the device to execute the maintenance operation, wherein the learned model is generated by learning based on log information of a job executed on the device and information of a type of maintenance instructed by a user after execution of the job.

* * * * *